(12) United States Patent
Matsuno et al.

(10) Patent No.: US 7,591,721 B2
(45) Date of Patent: Sep. 22, 2009

(54) VIDEO GAME THAT IMPOSES PENALTY FOR VIOLATION OF RULE

(75) Inventors: Yasumi Matsuno, Tokyo (JP); Yuichi Murasawa, Tokyo (JP); Shutaro Yokoyama, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 592 days.

(21) Appl. No.: 10/648,369

(22) Filed: Aug. 27, 2003

(65) Prior Publication Data
US 2004/0077394 A1 Apr. 22, 2004

(30) Foreign Application Priority Data
Oct. 21, 2002 (JP) .......................... P2002-305856

(51) Int. Cl.
A63F 9/24 (2006.01)
(52) U.S. Cl. .......................................... 463/8
(58) Field of Classification Search ................ 463/23, 463/1, 4, 7–9
See application file for complete search history.

(56) References Cited

U.S. PATENT DOCUMENTS
4,270,755 A * 6/1981 Willhide et al. ............. 463/2

FOREIGN PATENT DOCUMENTS
JP 2001-009163 1/2001
JP 2001-113050 4/2001
JP 2002-18142 1/2002

OTHER PUBLICATIONS

Grand Theft Auto III—Wikipedia, the free encyclopedia. Retrieved from the Internet: http://en.wikipedia.org/wiki/Grand_Theft_Auto_III.*
Monsters At Play: Grand Theft Auto III Review. Reviewed by Michael Johnson. Retrieved from the Internet: http://games.monstersatplay.com/review/playstation2/grand_theft_auto_3.php.*
GameSpot: Grand Theft Auto III. By Jeff Gerstmann. Retrieved from the Internet: http://www.gamerankings.com/itemrankings/launchreview.asp?reviewid=241528.*
Grand Theft Auto III game manual for PlayStation 2.*
The Unofficial Official Rules of Calvinball. Retrieved from the Internet: http://www.bartel.org/calvinball/.*

(Continued)

Primary Examiner—Peter DungBa Vo
Assistant Examiner—Jasson H Yoo
(74) Attorney, Agent, or Firm—Greenblum & Bernstein P.L.C.

(57) ABSTRACT

A rule (applied to a battle) is set according to a stage of the progress of a game every time the stage of the game advances. When a battle is started, either a player character or an enemy character that can execute an action is determined. When it is decided that the player character can execute the action, a player selects the action of the player character. When the action selected by the player is against a rule, a rule violation is recorded. When the result of the action of the player character is also against a rule, a rule violation is recorded. When the rule violation is recorded, a predetermined penalty is imposed on the player after the battle ends.

13 Claims, 15 Drawing Sheets

| PENALTY TYPE | CONTENTS | APPLYING OBJECT | YELLOW CARD | RED CARD |
|---|---|---|---|---|
| FINE (LOST_GIL) | GIL IS CONFISCATED (WHEN IT IS NOT PAID, SEND TO PRISON OF THE SAME WEIGHT) | ENTIRETY | 100 | 1000 |
| STATUS DOWN(STAT_DOWN) | AT LEAST ONE OF MAXIMUM HP, MAXIMUM MP, PHYSICAL ATTACK, PHYSICAL DEFENSE, MAGIC ATTACK, MAGIC DEFENSE, AND SPEED IS REDUCED (AMOUNTS CORRESPONDING TO ONE LEVEL ARE UNIFORMLY DECIDED) | PLAYER CHARACTER | ONE TYPE | TWO TYPE |
| CONSUMPTION ITEM CONFISCATION (LOST_TREASURE) | CONSUMPTION ITEM IS CONFISCATED | ENTIRETY | ONE ITEM IS CONFISCATED FROM LIGHT ITEM GROUP AT RANDOM | ONE ITEM IS CONFISCATED FROM HEAVY ITEM GROUP AT RANDOM |

OTHER PUBLICATIONS

NBA Live 96 game manual for Sega Genesis System (1995).*
"Dorimaga", Softbank Publishing, Inc., Nov. 8, 2002, vol. 19, No. 20, pp. 54-59 (circulated on Sep. 15, 2002).*
"DORIMAGA", by Softbank Publishing Inc., published Sep. 17, 2002 (circulated Sep. 15, 2002), vol. 19, No. 17, pp. 40-47.*
English Language Abstract of JP 2002-18142.
English Language Abstract of JP 2001-113050.
"Nintendo Dream" by Mainichi Communications, Inc., published Nov. 21, 2002, vol. 7, No. 13, pp. 26-29.
"Nintendo Dream" by Mainichi Communications, Inc., published Oct. 21, 2002 (circulated Sep. 21, 2002), vol. 7, No. 11, pp. 22-29.
"Weekly Famitsu" by Enterbrain Inc., published Sep. 20, 2002 (circulated Sep. 13, 2002), vol. 17, No. 38, pp. 26-29.
"Weekly Famitsu" by Enterbrain Inc., published Nov. 1, 2002, vol. 17, No. 44, pp. 133-137.
"DORIMAGA" by Softbank Publishing Inc., published Sep. 27, 2002 (circulated Sep. 15, 2002), vol. 19, No. 17, pp. 40-47.
"DORIMAGA" by Softbank Publishing Inc., published Nov. 8, 2002 (circulated Sep. 15, 2002), vol. 19, No. 20, pp. 54-59.
"V JUMP" by Shueisha Inc., published Nov. 1, 2002 (circulated Sep. 21, 2002), vol. 10, No. 11, pp. 65-66.
"V JUMP" by Shueisha Inc., published Dec. 1, 2002, vol. 10, No. 12, pp. 52-53.
"Famitsu Cube Plus Advance" by Enterbrain Inc., published Nov. 1, 2002 (circulated Sep. 21, 2002), vol. 4, No. 11, pp. 50-51.
"Famitsu Cube Plus Advance" by Enterbrain Inc., published Dec. 1, 2002 (circulated on Sep. 21, 2002), vol. 4, No. 12, p. 46.
"Dengeki Game Cube" by MediaWorks Inc., published Nov. 1, 2002, vol. 2, No. 11, pp. 8-10.
"Dengeki Game Cube" by MediaWorks Inc., published Dec. 1, 2002, vol. 2, No. 12, pp. 30-33.
"Nintendo Kid's" by Futabasha Publishers Ltd., published Nov. 1, 2002 (circulated on Sep. 21, 2002), vol. 14, No. 41, pp. 12-13.
"Nintendo Kid's" by Futabasha Publishers Ltd., published Dec. 1, 2002, vol. 14, No. 46, pp. 40-41.
"Weekly Shonen Jump" by Shueisha Inc., published Sep. 16, 2002 (circulated on Sep. 3, 2002), vol. 35, No. 36 (bind-in).
"Weekly Shonen Jump" by Shueisha Inc., published Oct. 28, 2002, vol. 35, No. 42, (bind-in).
Monthly Dengek-Oh by MediaWorks Inc., published Dec. 1, 2002, vol. 10, No. 15, pp. 44-47.
A screenshot of a website entitled "Final Fantasy Tactics Advance" at www.fft-a.com/gameguide/special_01.html, published no later than Oct. 10, 2002.
A screenshot of a website entitled "Final Fantasy Tactics Advance" at www.fft-a.com/gameguide/special_02.html, published no later than Oct. 10, 2002.
A screenshot of a website entitled "Final Fantasy Tactics Advance" at www.fft-a.com/feature/n_world.html, published no later than Oct. 10, 2002.
A screenshot of a website entitled "Final Fantasy Tactics Advance" at www.fft-a.com/feature/n_story.html, published no later than Oct. 10, 2002.
A screenshot of a website entitled "PlayOnline" at www.playonline.com/home/index-j-html, published no later than Oct. 10, 2002.
English Language Abstract of JP-2001-113050.
English Language Abstract of JP-2001-009163.
"Dengeki-oh", vol. 10, No. 14, Mediaworks, Inc., received by the Japanese Patent Office Library On Oct. 7, 2002, p. 161, together with a partial English language translation of the same.
Notice of Reasons for Rejection mailed on Aug. 31, 2004 w/ English language translation.
"DORIMAGA" by Softbank Publishing Inc., published Sep. 27, 2002, vol. 19, No. 17, cover page.
"DORIMAGA" by Softbank Publishing Inc., published Oct. 11, 2002, vol. 19, No. 18, cover page and p. 216.
"DORIMAGA" by Softbank Publishing Inc., published Oct. 25, 2002, cover page and p. 176.
"DORIMAGA" by Softbank Publishing Inc., published Nov. 8, 2002, vol. 20, cover page.

* cited by examiner

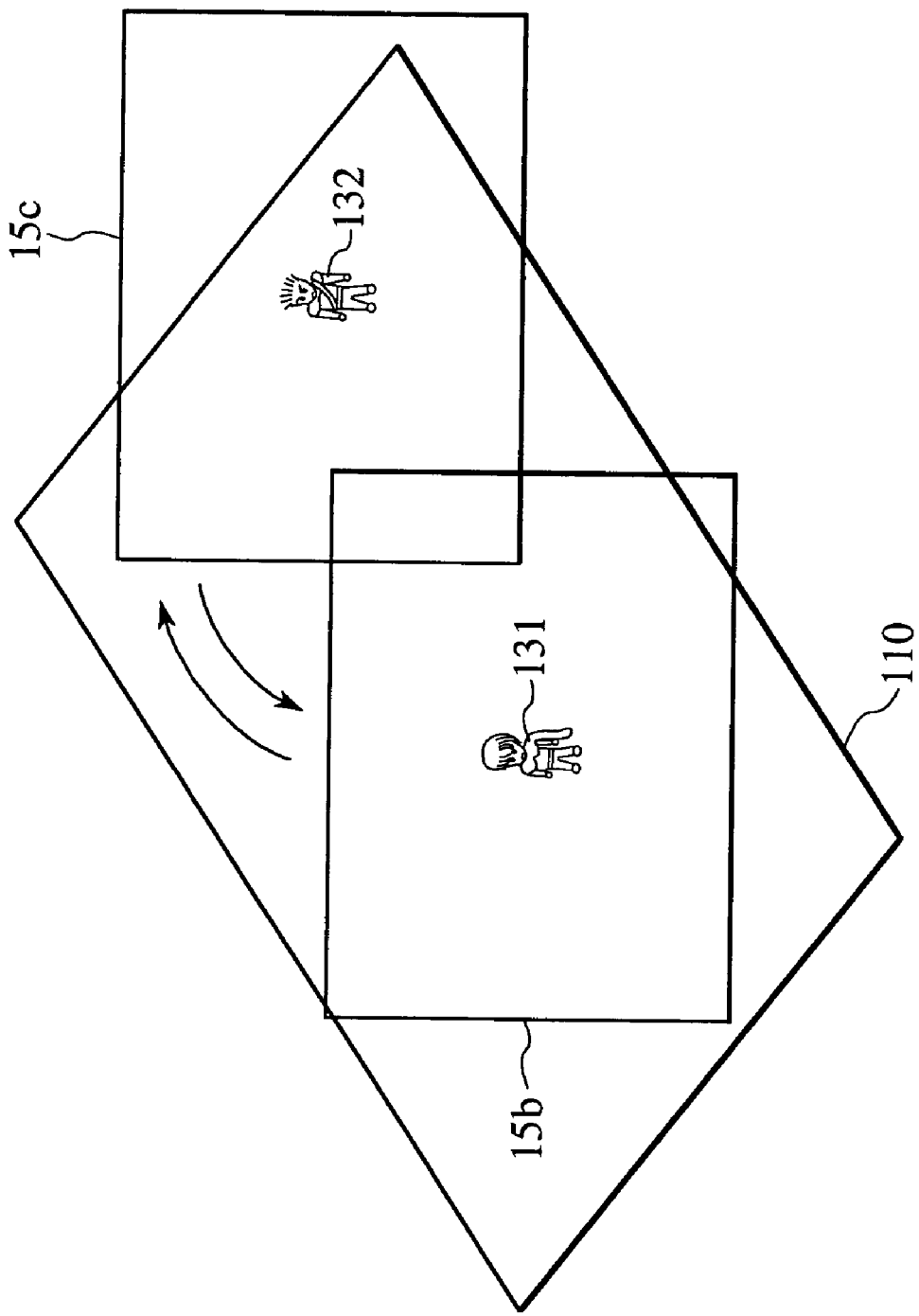

FIG. 5A

| Field |  |
|---|---|
| Gil | ⎫ |
| Item[1] | ⎬ 201 |
| Item_num[1] | ⎪ |
| ⋮ | ⎭ |
| Name | ⎫ |
| Indiv | ⎪ |
| Level | ⎪ |
| Exp | ⎪ |
| HP | ⎪ |
| HPMAX | ⎪ |
| MP | ⎪ |
| MPMAX | ⎪ |
| Status | ⎪ |
| StrAttack | ⎪ |
| StrDefense | ⎬ 202-1 |
| IntAttack | ⎪ |
| IntDefense | ⎪ |
| Speed | ⎪ |
| Flag_Battle | ⎪ |
| Flag_Prison | ⎪ |
| StopBattle | ⎪ |
| Xpos | ⎪ |
| Zpos | ⎪ |
| Redcard | ⎪ |
| Yellowcard | ⎪ |
| netID | ⎭ |
| Name | ⎫ |
| Indiv | ⎪ |
| ⋮ | ⎬ 202-2 |
| netID | ⎭ |
| Name | ⎫ |
| Indiv | ⎪ |
| ⋮ | ⎬ 202-3 |
| netID | ⎭ |
| ⋮ |  |
| Name | ⎫ |
| Indiv | ⎪ |
| ⋮ | ⎬ 202-n |
| netID | ⎭ |

FIG. 5B

| Field |  |
|---|---|
| MenuID | ⎫ |
| MenuID_OLD | ⎬ 211 |
| AbilityID | ⎪ |
| AbilityID_OLD | ⎭ |
| TermFlag | ⎫ |
| ItemFlag | ⎪ |
| Status | ⎪ |
| TargetNum | ⎪ |
| Damage[1] | ⎪ |
| ⋮ | ⎪ |
| Damage[k] | ⎬ 212-1 |
| Weapon[1] | ⎪ |
| Weapon[2] | ⎪ |
| CardFlag[1] | ⎪ |
| CardFlag[2] | ⎪ |
| LawID[1] | ⎪ |
| LawID[2] | ⎭ |
| TermFlag | ⎫ |
| ItemFlag | ⎪ |
| ⋮ | ⎬ 212-2 |
| LawID[2] | ⎭ |
| TermFlag | ⎫ |
| ItemFlag | ⎪ |
| ⋮ | ⎬ 212-3 |
| LawID[2] | ⎭ |
| ⋮ |  |
| TermFlag | ⎫ |
| ItemFlag | ⎪ |
| ⋮ | ⎬ 212-n |
| LawID[2] | ⎭ |

FIG. 6A

| LAW UNIQUE ID | RULE NAME | DETERMINATION TYPE | offset | RED CARD CONDITION | PENALTY TYPE |
|---|---|---|---|---|---|
| 001 | ITEM PROHIBITION | Category | ITEM | STONE_TERM | LOST_TREASURE |
| 002 | FIRE PROHIBITION | Ability | FIRE | STONE_TERM | LOST_GIL |
| 003 | BLIZZARD PROHIBITION | Ability | ICE | STONE_TERM | LOST_GIL |
| 004 | THUNDER PROHIBITION | Ability | THUNDER | STONE_TERM | LOST_GIL |
| 005 | SWORD PROHIBITION | Arm | CATEG_SWORD | STONE_TERM | LOST_TREASURE |
| 006 | SPEAR PROHIBITION | Arm | CATEG_LANCE | STONE_TERM | LOST_TREASURE |
| 007 | BLADE PROHIBITION | Arm | CATEG-BLADE | STONE_TERM | LOST_TREASURE |
| 008 | DAMAGE 20 ↑ | Damage | 20 | NONE | STAT_DOWN |
| 009 | DAMAGE 50 ↑ | Damage | 50 | NONE | STAT_DOWN |
| 010 | DAMAGE 100 ↑ | Damage | 100 | NONE | STAT_DOWN |
| . | . | . | . | . | . |

FIG. 6B

| STAGED LAW ID | STAGE 1 | STAGE 2 | STAGE 3 |
|---|---|---|---|
| 001 | 008 | 009 | 010 |
| 002 | 001 | 003 | 004 |
| 003 | 002 | 001 | 007 |
| 004 | 005 | 006 | 001 |
| . | . | . | . |

FIG. 7

| PENALTY TYPE | CONTENTS | APPLYING OBJECT | YELLOW CARD | RED CARD |
|---|---|---|---|---|
| FINE (LOST_GIL) | GIL IS CONFISCATED (WHEN IT IS NOT PAID, SEND TO PRISON OF THE SAME WEIGHT) | ENTIRETY | 100 | 1000 |
| STATUS DOWN(STAT_DOWN) | AT LEAST ONE OF MAXIMUM HP, MAXIMUM MP, PHYSICAL ATTACK, PHYSICAL DEFENSE, MAGIC ATTACK, MAGIC DEFENSE, AND SPEED IS REDUCED (AMOUNTS CORRESPONDING TO ONE LEVEL ARE UNIFORMLY DECIDED) | PLAYER CHARACTER | ONE TYPE | TWO TYPE |
| CONSUMPTION ITEM CONFISCATION (LOST_TREASURE) | CONSUMPTION ITEM IS CONFISCATED | ENTIRETY | ONE ITEM IS CONFISCATED FROM LIGHT ITEM GROUP AT RANDOM | ONE ITEM IS CONFISCATED FROM HEAVY ITEM GROUP AT RANDOM |

VIDEO GAME THAT IMPOSES PENALTY FOR VIOLATION OF RULE

CROSS REFERENCE TO RELATED APPLICATION

The present disclosure relates to subject matter contained in Japanese Patent Application No. 2002-305856, filed on Oct. 21, 2002, the disclosure of which is expressly incorporated herein by reference in its entirety.

BACKGROUND OF THE INVENTION

1. Field of the Invention

The present invention relates to video games. More specifically, the present invention relates to video games applying a predetermined rule to game progress and imposing a penalty when there is a rule violation.

2. Description of the Related Art

In the video games, generally, a player character is operated according to an instruction from a player and the game progresses based on the operation result of the player character. Various kinds of video games have been provided, and most of the video games include processing for a battle between the player character and a character that is operated by processing of a CPU of the video game apparatus or according to an instruction from the other player.

Regardless of the genre, such as a role playing game, an action game, or an adventure game, there is known a game including a battle between the player character and an enemy character. Moreover, for example, there is known a simulation game that causes a team of the player to battle an enemy team under the rule of sports to be simulated. In any kind of game, it is an important to maintain the player's interest in the game progress.

Unexamined Japanese Patent Publication 2002-18142 discloses a game that selects a character that will appear according to the circumstances of the actual game, which includes a battle between a player character and an enemy character. In this game, the player character can battle an enemy with the appropriate amount of power and it is possible to maintain the player's interest in the game. Unexamined Japanese Patent Publication 2001-113050 discloses a game in which a judge presents a yellow card or red card when the player's operation is against the rule of a sports simulation game.

However, in the game described in Unexamined Japanese Patent Publication 2002-18142, only the enemy character appearing is changed and the flow of the game progress is unchanged. In the game described in Unexamined Japanese Patent Publication 2001-113050, only the rule of the actual sports game is simulated.

In this way, according to the prior art, there were few games that caused a novel change in the game progress. For this reason, it was difficult to cause the player to continue to have an interest in the game progress.

SUMMARY OF THE INVENTION

An object of the present invention is to provide a video game apparatus, method, storage medium, and carrier wave that can cause a player to maintain interest in the game progress by providing a novel change in the flow of the game progress.

In order to attain the above object, a video game apparatus according to a first aspect of the present invention advances a game according to a player's instruction. The video game apparatus includes a progress degree detector that detects a degree of a game progress. The video game apparatus further includes a rule judge that determines a rule applicable when a player advances the game according to the degree of the game progress detected by the progress degree detector. The video game apparatus further includes an instruction input device that inputs a desired instruction of the player to advance the game. The video game apparatus further includes a rule violation determiner that determines whether a violation of the rule decided by the rule decider occurs based on the input instruction. The video game apparatus further includes a penalty processor that imposes a predetermined penalty when the rule violation determiner determines that the violation occurs.

In order to attain the above object, a video game apparatus according to a second aspect of the present invention includes a memory that stores a video game program and a processor that executes the video game program, and displays an image as a result of processing executed by the processor on a display device. The video game program is stored in the memory and causes the processor to detect a degree of a game progress, and to determine a rule applicable when a player advances the game according to the degree of the game progress. The program further causes the processor to input a desired instruction of the player to advance the game, and to determine whether a violation of the determined rule occurs based on the input instruction. The program further causes the processor to impose a predetermined penalty when it is determined that the violation occurs.

In the game apparatus according to the first and second aspects, the rule as an object on which the penalty is imposed changes according to the game progress. By the change in the game progress, a novel change appears in the game progress. The change in the game progress makes it possible for the player to maintain interest in the game for a long time.

In order to attain the above object, a video game apparatus according to a third aspect of the present invention advances a game according to a player's instruction. The video game apparatus includes a rule storage that stores a rule applicable when a player advances the game. The video game apparatus further includes an instruction input device that inputs a desired instruction of the player to advance the game. The video game apparatus further includes a rule violation determiner that determines whether a violation of the rule stored in the rule storage occurs based on the input instruction. The video game apparatus further includes a violation history storage that stores a history of the determined violations. The video game apparatus further includes a penalty processor that imposes a predetermined penalty with a degree according to the stored violation history when the rule violation determiner determines that the violation occurs.

In order to attain the above object, a video game apparatus according to a fourth aspect of the present invention includes a memory that stores a video game program and a processor that executes the video game program, and displays an image as a result of processing executed by the processor on a display device. The video game apparatus further includes a second memory that stores a rule applicable when a player advances a game. The video game program is stored in the memory and causes the processor to input a desired instruction of the player to advance the game, and to determine whether a violation against the stored rule occurs based on the input instruction. The program further causes the processor to store a history of the determined violations, and to impose a predetermined penalty with a degree according to the stored history when it is determined that the violation occurs.

In the game apparatus according to the second and fourth aspects, when the rule violation occurs based on the player's instruction, the history is stored. When a new rule violation occurs, the weight of the penalty to be imposed regarding the new rule violation is changed according to the storage of the rule violations so far. By the change in the weight of the penalty, a novel change appears in the game progress. The change in the game progress makes it possible for the player to continue to have an interest in the game for a long time.

The video game apparatus according to the first to fourth aspects can be applied to a general-purpose computer, such as a personal computer, in addition to an apparatus dedicated to the video game. The game of the present invention may be applied to other electronic equipment, which can operate as a computer apparatus, such as a cellular phone. These video game apparatuses may be used regardless of whether they are stationary types or portable types.

The video game program stored in the memory in the video game apparatus according to the second and fourth aspects can be recorded on a computer-readable storage medium. The computer-readable storage medium may be a storage medium constructed to be movably loaded with the computer apparatus and provided separately from the computer apparatus. The computer-readable storage medium may be a storage medium such as a fixed disc device that is included in the computer apparatus and provided together with the computer apparatus. In the video game program stored in the memory in the video game apparatus according to the second and fourth aspects, the data signal can be superimposed on a carrier wave from a server apparatus existing on a network and the result is distributed via the network.

In order to attain the above object, a method according to a fifth aspect of the present invention advances a game executed by a computer apparatus. The method includes detecting a degree of a game progress, and determining a rule applicable when a player advances the game according to the detected degree of the game progress. The method further includes inputting a desired instruction of the player to advance the game, and determining whether a violation of the determined rule occurs based on the instruction input by the player. The method further includes imposing a predetermined penalty when it is determined that the violation of the rule occurs.

In order to attain the above object, a method according to a sixth aspect of the present invention advances a game executed by a computer apparatus that stores a rule, applicable when a player advances the game, in a memory. The method includes inputting a desired instruction of the player to advance the game, and determining whether a violation of the stored rule occurs based on the input instruction. The method further includes storing a history of the determined violations, and imposing a predetermined penalty with a degree according to the stored history when it is determined that the violation occurs.

BRIEF DESCRIPTION OF THE DRAWINGS

FIG. 4 is a view explaining movement of a display portion in the battle screen according to an embodiment of the present invention;

FIG. 5A is a view illustrating current data changed according to the progress of a game according to an embodiment of the present invention;

FIG. 5B is a view illustrating law check data according to an embodiment of the present invention;

FIG. 6A is a view illustrating an individual law table according to an embodiment of the present invention;

FIG. 6B is a view illustrating a staged law table according to an embodiment of the present invention;

FIG. 7 is a view showing the relationship between penalty types and the contents according to an embodiment of the present invention;

DETAILED DESCRIPTION OF PREFERRED EMBODIMENT

An embodiment of the present invention will be explained with reference to the accompanying drawings.

Figure 1:
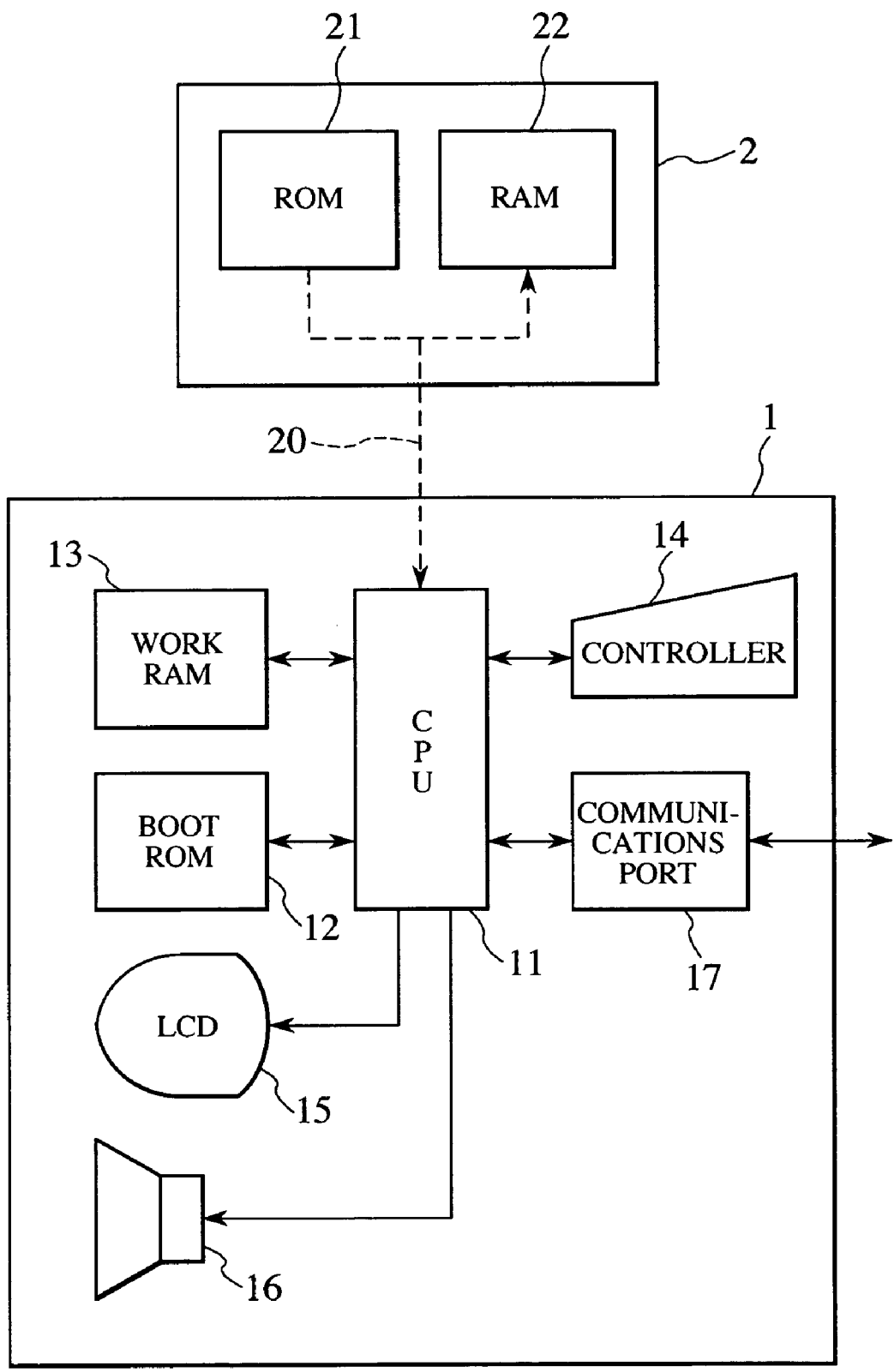
FIG. 1 is a block diagram illustrating the configuration of a portable game device that is applied to an embodiment of the present invention.

FIG. 1 is a block diagram illustrating the configuration of a portable game device that is applied to an embodiment of the present invention. As illustrated in the figure, this portable game device includes a game device main body 1 and a cartridge 2. The cartridge 2 is inserted into a slot of the game device main body 1 and is individually provided for each game. The video game (hereinafter simply called game) according to this embodiment is implemented by inserting the cartridge 2 including a predetermined game program into the game device main body 1.

The game device main body 1 includes a CPU (Central Processing Unit) 11, a boot ROM (Read Only Memory) 12, a work RAM (Random Access Memory) 13, a controller 14, an LCD (Liquid Crystal Display) 15, a speaker 16, and a communications port 17. The cartridge 2 has a ROM 21 and a RAM 22. The ROM 21 and RAM 22 of the cartridge 2 are connected to the CPU 11 of the game device main body 1 via a connector 20.

The respective structural components 12 to 17 of the game device main body 1 and the ROM 21 and RAM 22 of the cartridge 2 are connected to the CPU 11, and the CPU 11 executes programs stored in the boot ROM 12 and ROM 21 to control the portable game device. The boot ROM 12 prestores a boot program for initializing the work RAM 13 of the game device main body 1 and a register of the CPU 11 and the like. The work RAM 13 is used as a work area when the CPU 11 executes the program.

The controller 14 includes a cross key, which functions as a joy stick, and multiple operation keys, and inputs a player's instruction to the CPU 11 by these key operations. The LCD 15 displays a game space, a character existing therein and a message necessary for the game progress according to the execution of the game program by the CPU 11. The speaker 16 outputs sound effects and the like based on the circumstance of the game progress according to the game program. The communications port 17 transmits/receives information to/from another portable game device and or a stationary game device.

In the cartridge 2, the ROM 21 stores a game program for implementing the game according to this embodiment. When the game is interrupted by the player's instruction, the RAM 22 saves data relating to the game progress stored in the work RAM 13 in order to restart the game from the interrupting time. The RAM 22 is backed up by a battery (not shown) and the storage contents are not erased even if power of the game device main body 1 is interrupted and the cartridge 2 is detached from the game main body 1. In place of the RAM 22, a writable/erasable nonvolatile memory such as a flash memory may be used.

The procedure of the game progress will be briefly explained. In the process that progresses the game, some events occur, and the player clears the events to advance the story of the game. The game is advanced as the player operates the player character. The player can arbitrarily select a player character to be used in the game from multiple player characters. At an event occurring time, the player can select two or more player characters that participate in the event, and choose one of the selected player characters as a leader.

Figure 2:
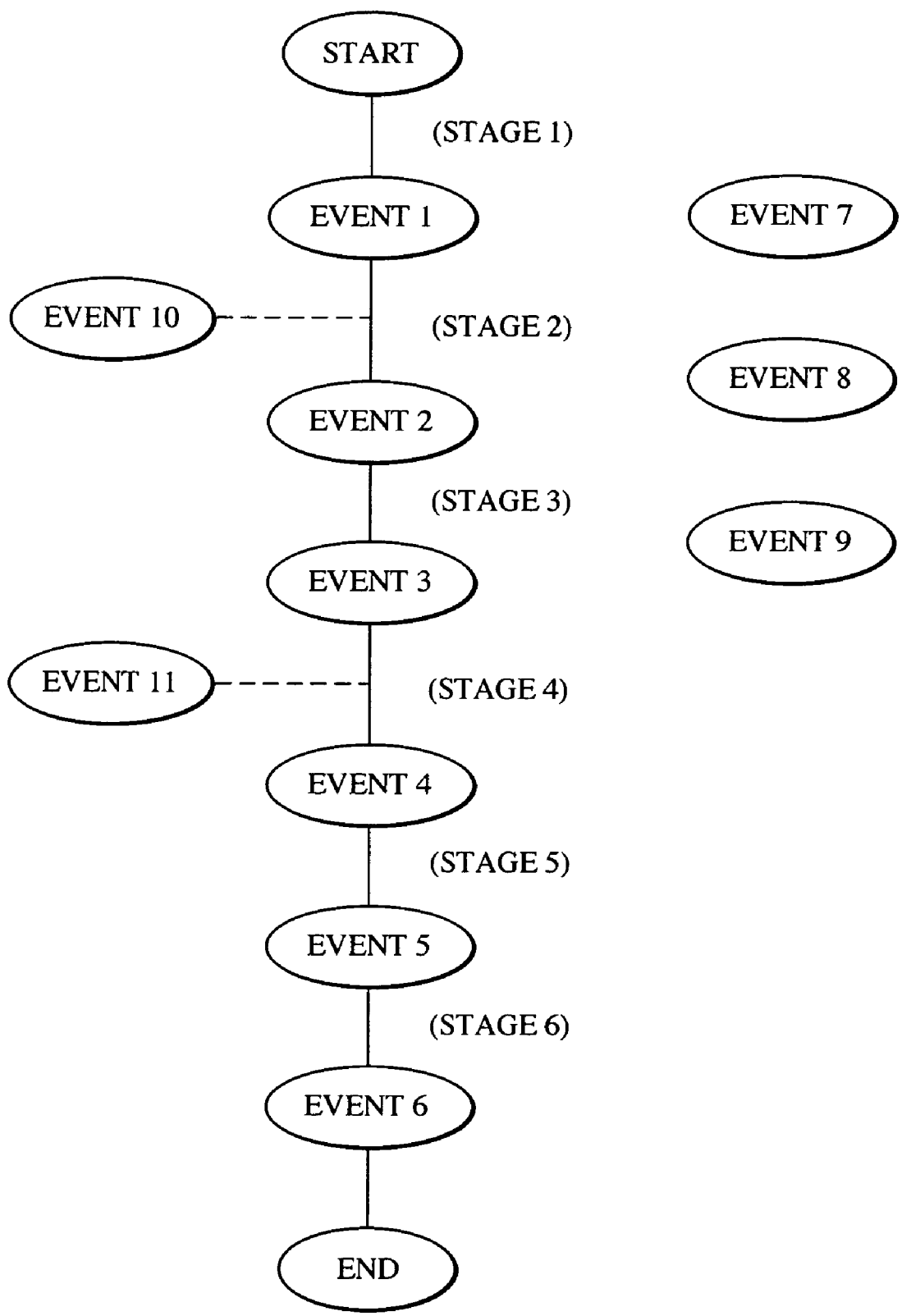
FIG. 2 is a view schematically illustrating occurrence of an event in the video game according to an embodiment of the present invention.

FIG. 2 is a view schematically illustrating an occurrence of the events in the game according to this embodiment. This game has a possibility that eleven events including event 1 to event 11 will occur before the game ends. Each event occurs when a predetermined condition fixed for each event is established. Events 1 to 6 are those that are essential for the story of the game, and the story of the game does not progress unless these events are cleared in order. Every time when events 1 to 6 are cleared sequentially, the story of the game proceeds to a next stage. When the event 6 is cleared, an ending image is displayed on a LCD 15, thereafter the game ends.

Events 7 to 11 are arbitrary events, and even if these events can be neither generated nor cleared, the story of the game can be moved forward. The game can be also finally ended. Events 7 to 9 are those that occur at random regardless of the game progress. Event 10 may occur between events 1 and 2 and event 11 may occur between events 3 and 4.

In order to advance the game as clearing the aforementioned events 1 to 11, the player moves the player characters on the map. One that occurs as an event is a battle between the player characters and the enemy character (in some cases, multiple enemy characters are provided and a leader is fixed) in this embodiment. A screen to be displayed on the LCD 15 is changed at the time when the player characters are moved on the map during the events 1 to 11 and when the events 1 to 11 occur.

Figure 3A:
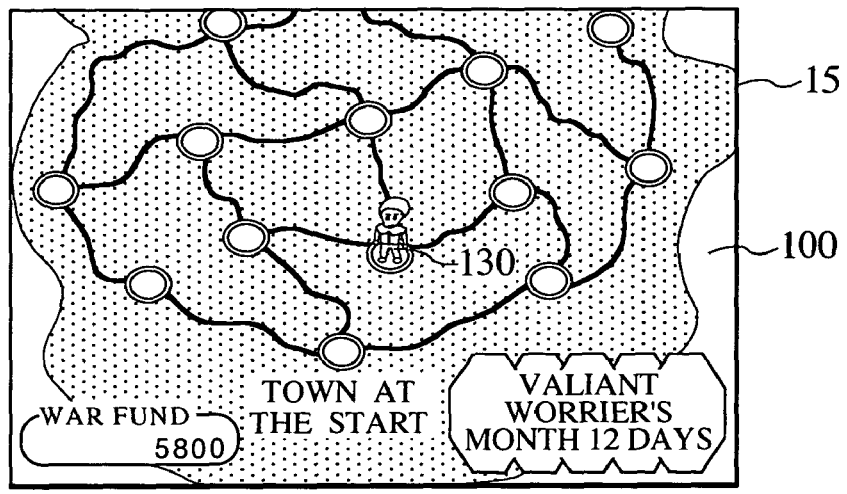
FIG. 3A is a view illustrating a world map according to an embodiment of the present invention.

FIG. 3A is a view illustrating a screen of a world map displayed on the LCD 15. A world map 100 is formed in such a way that multiple towns (shown by circles) are arranged on a field having a predetermined geographic feature formed. A location where a player character 130 is displayed on the world map 100 is a town where the player character is currently present. The player moves the player character between the towns on the world map 100. The player character moves between the towns on the world map, so that date virtually set in the game progress is updated.

Figure 3B:
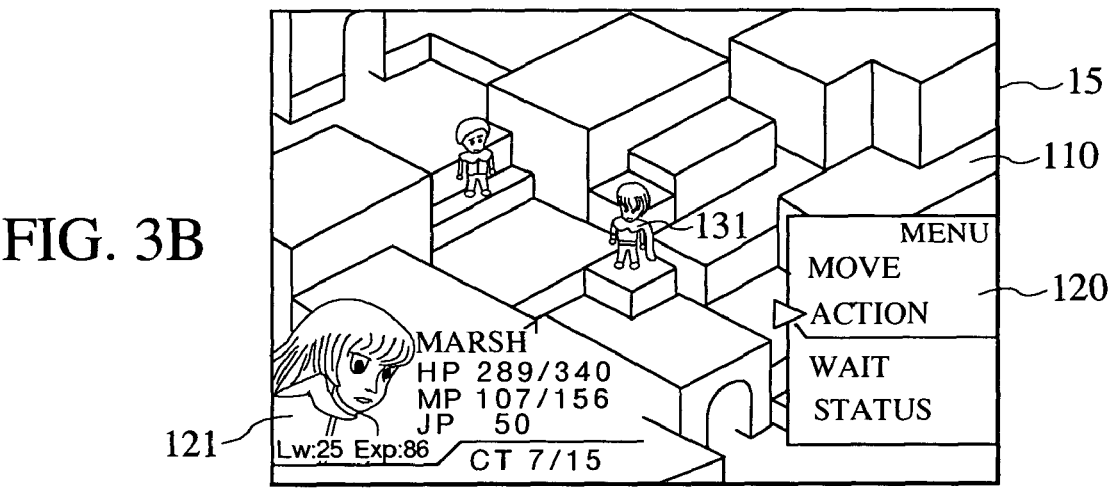
FIGS. 3B and 3C are views each illustrating a battle screen according to an embodiment of the present invention.
Figure 3C:
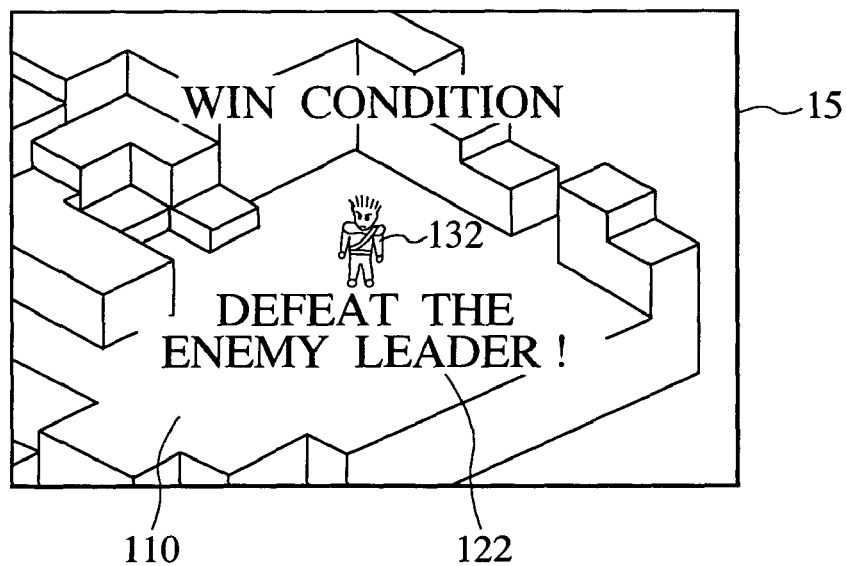

A local map (not shown) is formed for each town on the world map 100. The player operates the controller 14 to move the player character on the local map. Alternatively, the player character may move on only the world map 100 and a battle map 110 to be described later (FIGS. 3B, 3C, and 4). If a predetermined condition is established while the player character moves on the world map 100 and the local map, the events 1 to 11 occur according to the established condition.

FIGS. 3B and 3C are views each illustrating a battle screen. FIG. 3B illustrates a battle screen that is displayed when the battle is started and during the battle, and FIG. 3C illustrates a victory condition display screen that is displayed at first in the battle. The battle between the player characters and the enemy characters is performed on the battle map 110. FIGS. 3B and 3C illustrate screens at the same battle, but they are different from each other in the portion of the battle map 110 displayed on the LCD 15. This will be described later.

In the battle screen at the battle starting time shown in FIG. 3B, an instruction selection window 120 and an instruction object character window 121 are displayed in addition to a leader 131 of the player characters. The instruction selection window 120 is used to select and input the player's instruction. The contents of the instruction selection window 120 may be different from the contents shown in FIG. 3B. When there is no player character as an object to which the player can input an instruction, the instruction object character window 121 is not displayed in some cases. In the victory condition display screen illustrated in FIG. 3C, a message 122 indicating a condition for a victory and a leader 132 of the enemy characters are displayed.

FIG. 4 is a view explaining movement of a display portion in the battle screen. When the battle is started, the multiple characters including the leader 131 of the player characters and the leader 132 of the enemy characters are arranged on the battle map 110. In the battle screen at the starting time, an area 15b having a predetermined size where the leader 131 of the player characters is placed at the center is displayed as a battle screen at the starting time shown in FIG. 3B. The battle map 110 displayed in the battle screen at the starting time shown in FIG. 3B corresponds to a portion included in an area 15b of the battle map 110 of FIG. 4.

In the victory condition display screen, since the victory condition is "defeat the enemy leader", an area 15c (having the same size as that of the area 15b) where the leader 132 of the enemy characters is placed at the center is displayed as the victory condition display screen of FIG. 3C. The battle map 110 displayed in the victory condition display screen of FIG. 3C corresponds to a portion included in the area 15c of the battle map 110 of FIG. 4.

In FIG. 3C, since the victory condition is "defeat the enemy leader", the area 15c where the leader 132 of the enemy characters is placed at the center is displayed as the victory condition display screen. In the case of another victory condition, the victory condition display screen is not always decided in this way. For example, if the victory condition is "move to designated point", an area around the designated point is displayed as the victory condition display screen.

Although not illustrated, in the battle screen where the battle is in progress, the area to be displayed on the LCD 15 is sequentially changed such that the player can easily recognize the battle progress. In the battle screen at the starting time, the victory condition display screen and the battle screen showing the battle in progress, the reason why the portion to be displayed is thus moved is to balance the size of display and the contents since the display area of the LCD 15 of the portable game device is limited. In other words, each character is displayed with such a size that the player can recognize the characters in the screen with the limited size without considering the size of the battle map 110 too much.

In the battle, an operation that the player should not instruct to the player character is defined as a rule in the game. Also, an operation in which the result obtained by instructing the operation should not be a predetermined result is defined as a rule in the game. The rule changes according to the game progress, but when a rule violation occurs, a yellow card or red card is presented to the player character, and a penalty is imposed on the player. The rule and the penalty to be imposed on the player in the case of the rule violation will be specifically described later.

An explanation will next be given of various data to be used in the game according to this embodiment. Variable data, which varies according to the game progress, is stored in the work RAM 13 of the game main body 1. Fixed data, which does not vary according to the game progress, is prestored in the ROM 21 of the cartridge 2. When the game is started from the beginning, initial data of variable data prestored in the ROM 21 is transferred to the work RAM 13. When the game is restarted midway, variable data saved in the RAM 22 when the game is interrupted is transferred to the work RAM 13.

An explanation will be next given of variable data to be stored in the work RAM 13. Though there are various kinds of variable data necessary for the game progress, the following will explain data relating to embodiments of the present invention.

FIG. 5A shows current data that is changed according to the game progress, namely, data indicating under what circumstance the game is advanced. Current data includes general data 201 and player character-specific data 202-1 to 202-n.

General data 201 is common data regardless of data by player character, and includes Gil (amount of virtual money that the player possesses in the world of the game) and Item (name of the item that the player possesses), and Item_num (the number of items). When the number of kinds of items that the player possesses is two or more, combinations of Item and Item_num, which correspond to the number of kinds, are provided and registered. The items, which the player can possess, are classified into light items and heavy items according to their values in the game progress, and they are registered as Item data by classified group.

The player character-specific data 202-1 to 202-n include Name (name of the player character), Indiv (player character unique ID), Level (current level of the player character), Exp (Experience value: one that determines a level), HP (Hit Point: amount of residual damage withstanding the attack from the enemy, the battle is impossible when 0), HPMAX (Hit Point MAXimum value), MP (Magic Point: amount of usable magic), MPMAX (Magic Point MAXimum value), Status (there is a case where the battle is impossible), StrAttack (physical attack), StrDefense (physical defense), IntAttack (magic attack), IntDefense (magic defense), Speed (speed that decides an attack order in the battle), Flag_Battle (Flag in Battle), Flag_Prison (Flag in Prison (battle participation impossible) flag), StopBattle (the number of residual battles in prison), Xpos (X-coordinate on the battle map), Zpos (Z-coordinate on the battle map), Redcard (the cumulative number of red cards), Yellowcard (the cumulative number of red cards), and netID (ID of the character in battle that is allocated at the time of participating in the battle).

Among these data, Level, HP, HPMAX, MP, MPMAX, Status, StrAttack, StrDefense, IntAttack, IntDefense, and Speed are characteristic values of the player character that indicate whether the player character has an advantageous position or a disadvantageous position in the battle, and exert a direct influence on the game progress.

Regarding the enemy character, though not illustrated, the same data as that of the player character is prestored in the ROM 21 and data corresponding to the enemy character that participates in the battle is copied to the work RAM 13 and used. Data of the enemy character includes Name, Indiv, Level, Exp, HP, HPMAX, MP, MPMAX, Status, StrAttack, StrDefense, IntAttack, IntDefense, Speed, Xpos, and Zpos. The meanings of these data items are the same as those of data corresponding to the player character.

FIG. 5B is a view illustrating law check data. The law is selected and applied as a rule at each point in the game progress. Although both the rule and the law are regulations relating to the game progress, in this embodiment, the law is applicable as a regulation in the event, and the rule is actually applied as a regulation in the event. Law check data in FIG. 5B includes general data 211 and player character-specific data 212-1 to 212-n.

The general data 211 includes MenuID (menu ID that is designated in connection with the action of the player character), MenuID_OLD (the latest menu ID that is recorded on MenuID), AbilityID (ability ID when the designated menu is ability), and AbilityID_OLD (the latest ability ID that is recorded on Ability ID).

The player character-specific data 212-1 to 212-n include TermFlag (the flag being active when another character is made impossible to battle by petrifying the other character or HP=0 is established), ItemFlag (the flag being active when an item is stolen from the other character), Status (the flag being active when a status abnormality is provided to the other character), TargetNum (the number of characters as a target for an action), Damage [1]-[k] (damage or recovery value given to the other character by the action), Weapon [1], [2] (kinds of weapons used in the action), CardFlag [1], [2] (the flag being active when a yellow card or red card is received in the battle), and LawID [1], [2] (law unique ID of the law that has been violated (to be described later)).

An explanation will be next given of fixed data stored in the ROM 21. A law table is prepared as fixed data. The law table includes two tables, that is, an individual law table illustrated in FIG. 6A and a staged law table illustrated in FIG. 6B.

In the individual law table illustrated in FIG. 6A, a law unique ID, a rule name, a judgment type, an offset, a red card condition, and a penalty type are stored in association with each other. The law unique ID is an ID for identifying each law. The law name is a name that is given to each law. The judgment type is used to judge whether the action of the character is against the rule. The offset shows a specific action or a result of the action that is against the rule. The red card condition shows a condition when the red card is presented instead of the yellow card to the player character, even at the first rule violation. The penalty type shows the type of the penalty that is imposed on the player in the case of the rule violation.

In the staged law table in FIG. 6B, a staged law ID and a law unique ID for each stage are stored in association with each other. The staged law ID corresponds to the date of each stage. In the case of the first day of first stage 1, a law, which includes a staged law ID of "001" and a law unique ID of "008" (namely, damage of 20 or more), is applied as a rule.

An explanation will be next given of the penalty to be given to the player when the rule violation occurs according to the law tables in FIGS. 6A and 6B. FIG. 7 is a view showing penalty types and the contents. This figure is not stored in the ROM 21 as a table, but a game program is created such that the penalty with the contents described in FIG. 7 is imposed on the player who violates the rule.

The penalty types include a fine (LOST_GIL), a status down (STAT_DOWN), and a consumption item confiscation (LOST_TREASURE). In any penalty type, the weight of the penalty to be imposed differs depending on whether the yellow card is presented by the rule violation or the red card is presented. In a case that the penalty type is the fine or the consumption item confiscation, the penalty is imposed on the entire player character as an object to be applied. In a case that the penalty type is the status down, the penalty which degrades any one or two kinds of, for example, Level, HP, HPMAX, MP, MPMAX, Status, StrAttack, StrDefense, IntAttack, IntDefense, and Speed, is imposed on the player character that violates the rule.

The following will explain processing to be executed to advance the game in the game according to an embodiment. When processing other than display processing is carried out, there is a case in which processing for displaying an image corresponding to the processing on the LCD 15 is carried out. However, regarding display processing other than display processing unique to this embodiment, some explanations will be omitted.

When power of the game device main body 1 is turned on, an initial screen for selecting whether the game is started from the beginning or restarted midway is displayed on the LCD 15. The player operates the controller 14 according to the initial screen to select whether the game is started from the beginning or restarted midway. When the game is started from the beginning, initial data is loaded on the work RAM 13 from the ROM 21 and processing of the game is started. When the game is restarted, saved data is loaded on the work RAM 13 from the RAM 22 and processing of the game is started.

Figure 8:
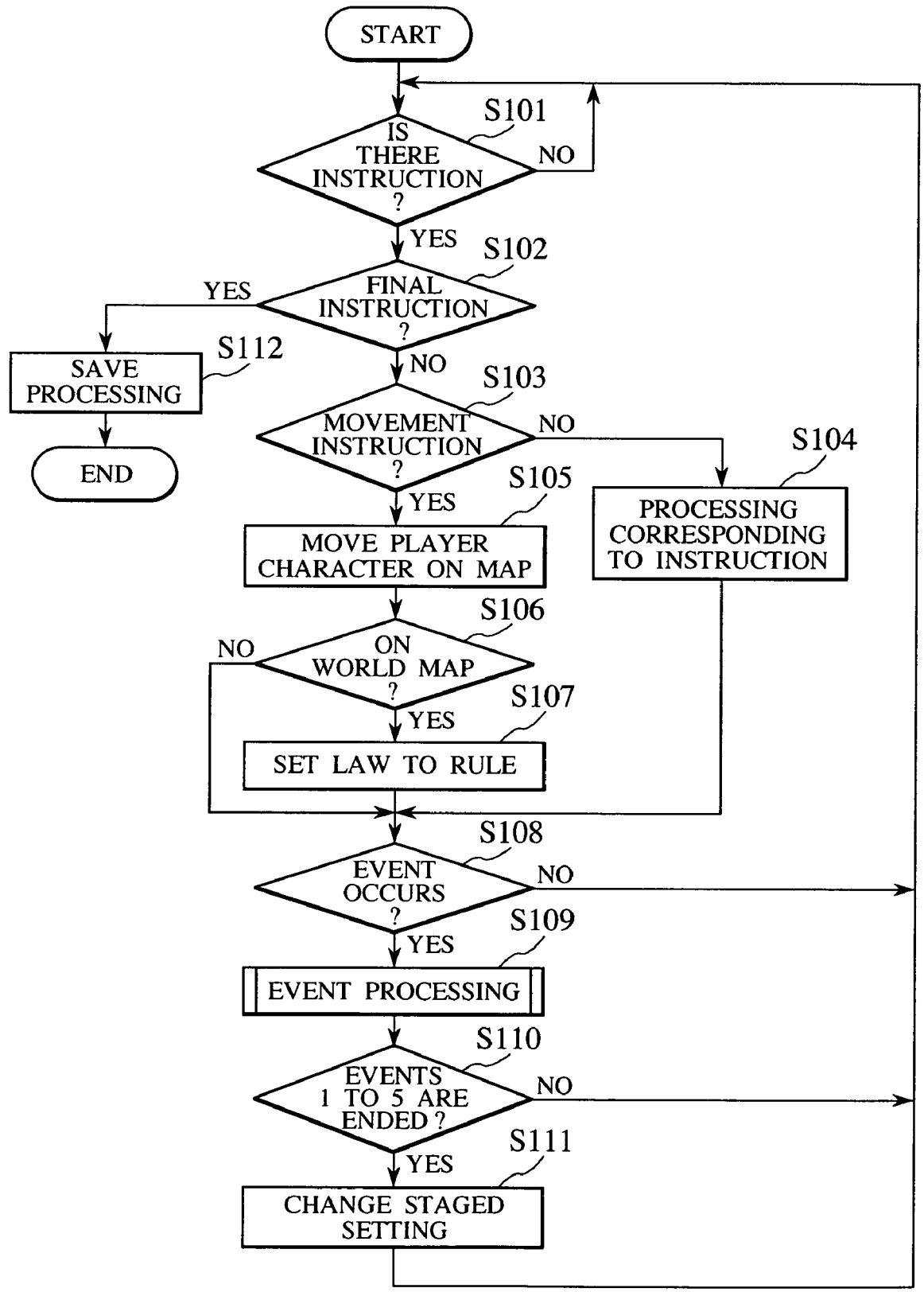
FIG. 8 is a flowchart illustrating processing of a main routine in the video game according to an embodiment of the present invention.

FIG. 8 is a flowchart illustrating processing of a main routine in the game according to this embodiment. When the processing of the main routine is started, the CPU 11 determines whether a player's instruction is input from the controller 14 (step S101). Before the player's instruction is input from the controller 14, processing in step S101 is repeated to wait for inputting of an instruction from the player.

When the player's instruction is input, the CPU 11 determines whether the input instruction is a final instruction (step S102). When the input instruction is not the final instruction, the CPU 11 determines whether the input instruction is a movement instruction to the player character (step S103). When the input instruction is not the movement instruction, the CPU 11 performs processing according to the contents of the instruction (step S104) and the processing flow proceeds to step S108.

When the input instruction is the movement instruction, the CPU 11 moves the player character on the map (world map 100 or a local map) (step S105). The CPU 11 determines whether the player character has moved on the world map 100 (step S106). When the player character has moved on the world map 100, the CPU 11 updates a date in the game, and makes the setting of the law set in the staged law table of FIG. 6B to be associated with the updated date in the current stage (step S107). After that, and also when not on the world map, the processing flow proceeds to step S108.

In step S108, the CPU 11 determines whether an event occurrence condition has been established. When the event occurrence condition has been established, the CPU 11 causes the event whose occurrence condition has been established to occur and executes event processing that shifts to processing relating to the event (step S109). The details on the event processing will be described later. When the event is ended in the event processing, the CPU 11 determines whether the ended event is any one of events 1 to 5 (step S110).

When the ended event is any one of events 1 to 5, the CPU 11 changes the setting of the game stage to a next stage (step S111). Then, the processing flow goes back to step S101. When the event occurrence condition is not established in step S108 or the ended event is not any one of events 1 to 5 in step 110, the processing flow goes back to step S101 directly.

When the instruction input in step S102 is the end instruction, the CPU 11 performs save processing for saving variable data stored in the work RAM 13 to the RAM 22 of the cartridge 2 (step S112). When the save processing is ended, the processing in this flowchart is ended.

Figure 9:
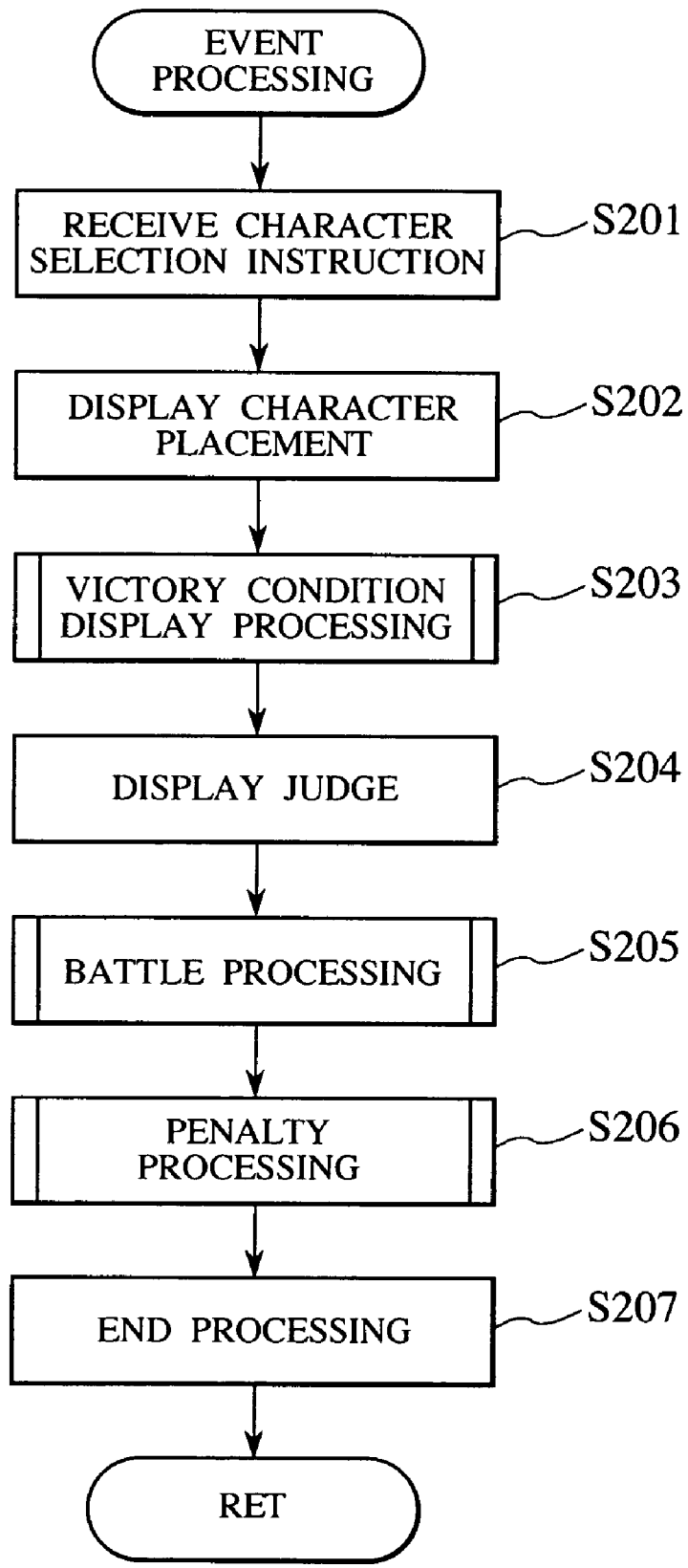
FIG. 9 is a flowchart illustrating an example of event processing of FIG. 8.

The following will specifically explain the event processing in step S109. FIG. 9 is a flowchart illustrating the event processing. The event herein is the battle between the player characters and the enemy characters as mentioned above. When the event processing is started, the CPU 11 receives a player's instruction input from the controller 14 in connection with the selection of the player characters that participate in the battle (step S201).

When receiving the instruction about the selection of the player character, the CPU 11 places the selected player character and the enemy character that participates in the battle on the battle map 110, and performs processing for displaying them on the LCD 15 (step S202). The battle screen displayed here is the same as the battle screen at the battle starting time where the leader of the player characters is displayed at the center as illustrated in FIG. 3B. When this screen is once displayed, the CPU 11 performs victory condition display processing for displaying the victory condition display screen as illustrated in, for example, FIG. 3C on the LCD 15 (step S203).

Figure 10:
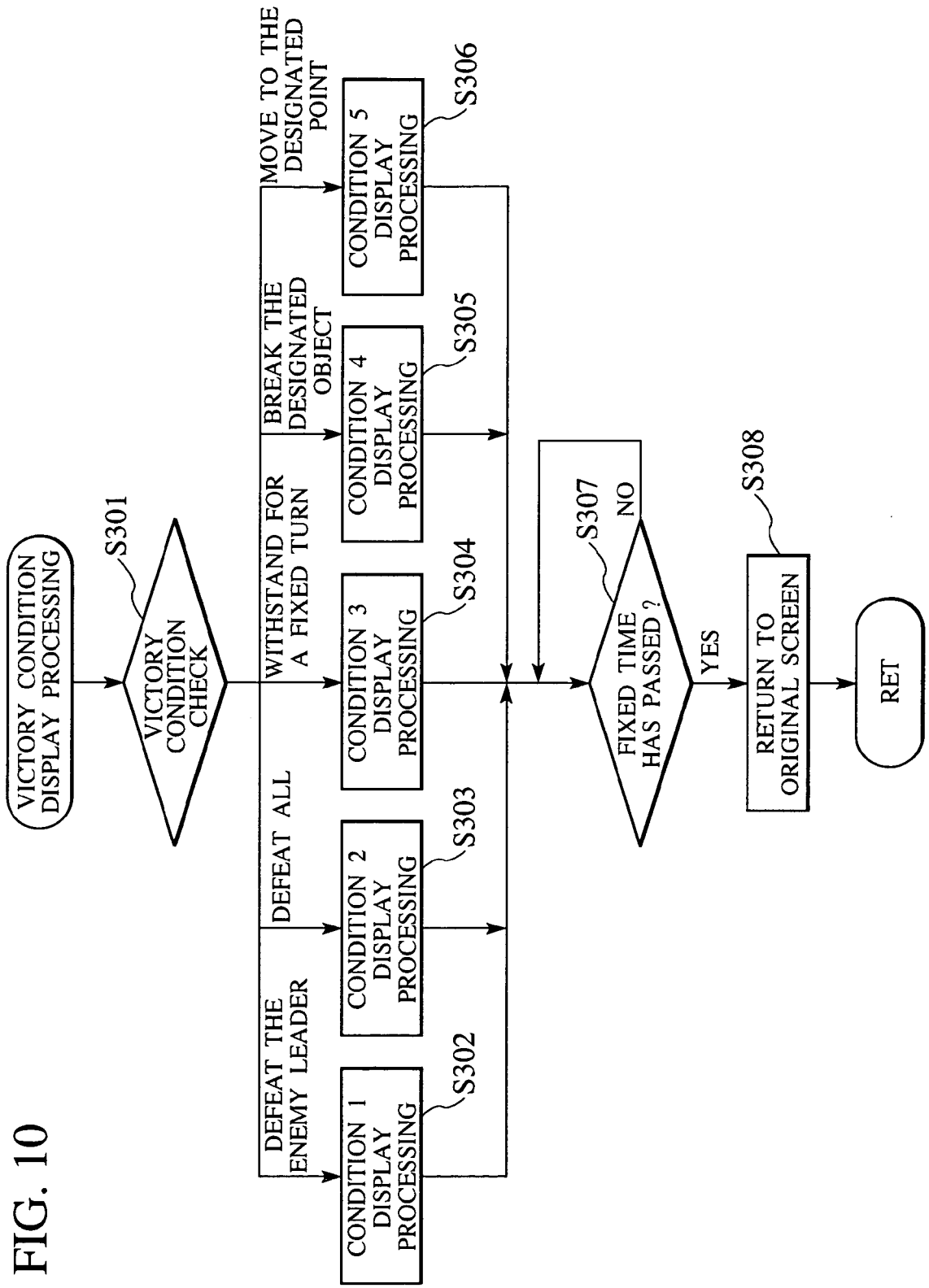
FIG. 10 is a flowchart illustrating an example of victory condition display processing of FIG. 9.

FIG. 10 is a flowchart illustrating the victory condition display processing in step S203. In the victory condition display processing, the CPU 11 checks which victory condition is set in this battle (step S301). As a settable victory condition, there are provided five conditions, "defeat the enemy leader", "defeat all", "withstand for a fixed turn", "break the designated object", and "move to the designated point." The CPU 11 executes any one of condition 1 display processing to condition 5 display processing in steps S302 to S306 according to the check result of the victory condition.

The condition 1 display processing will be explained. In a case where the condition 1 display processing is performed, the leader of the enemy characters is also placed on the battle map 110. The screen first displayed on the LCD 15 uses the area 15b as the display area where the leader 131 of the player characters is placed at the center as illustrated in FIG. 4. The screen using the area 15b as the display area where the leader 131 of the player characters is placed at the center is displayed on the LCD 15, and a message screen "victory condition defeat the enemy leader" is added and displayed thereon.

In the condition 2 display processing to the condition 5 display processing, similar to the leader 131 of the enemy characters in the condition 1 display processing, an object to be displayed at the center of the screen is fixed. One that is displayed at the center of the screen is the leader of the enemy characters in the condition 2 display processing, the leader of the player characters in the condition 3 display processing, the designated object in the condition 4 display processing, and the designated point in the condition 5 display processing, respectively.

In any of the condition 1 display processing to the condition 5 display processing, an image including the battle map 110 other than the unit relating to the victory condition is toned down and displayed. Regarding the victory condition, the unit that is not toned down is the leader of the enemy characters in the condition 1 display processing, all enemy characters in the condition 2 display processing, all player characters in the condition 3 display processing, the designated object in the condition 4 display processing, and the designated point in the condition 5 display processing, respectively.

When the victory condition display screen is displayed on the LCD 15 by any one of the condition display processing in steps S302 to S306, the CPU 11 waits for a passage of a fixed time since the display of the victory condition display screen (step S307). After passing the fixed time since the display of the victory condition display screen, the CPU 11 returns the screen displayed on the LCD 15 to the original screen (screen displayed in step S202) (step S308). Then, the victory condition display processing is ended.

When the victory condition display processing is ended and the processing flow goes back to the event processing in FIG. 9, the CPU 11 places a judge character on the battle map 110, and displays the battle screen including the judge character on the LCD 15 (step S204). The judge character is a non-player character that is used to present the yellow card or red card to the player character that breaks the rule. When the display of the judge character is ended, the CPU 11 executes battle processing for actually carrying out the battle between the player characters and the enemy characters (step S205). A portion, which is displayed as the battle screen in the battle map 110, is changed according to the battle progress by the battle processing.

Figure 11:
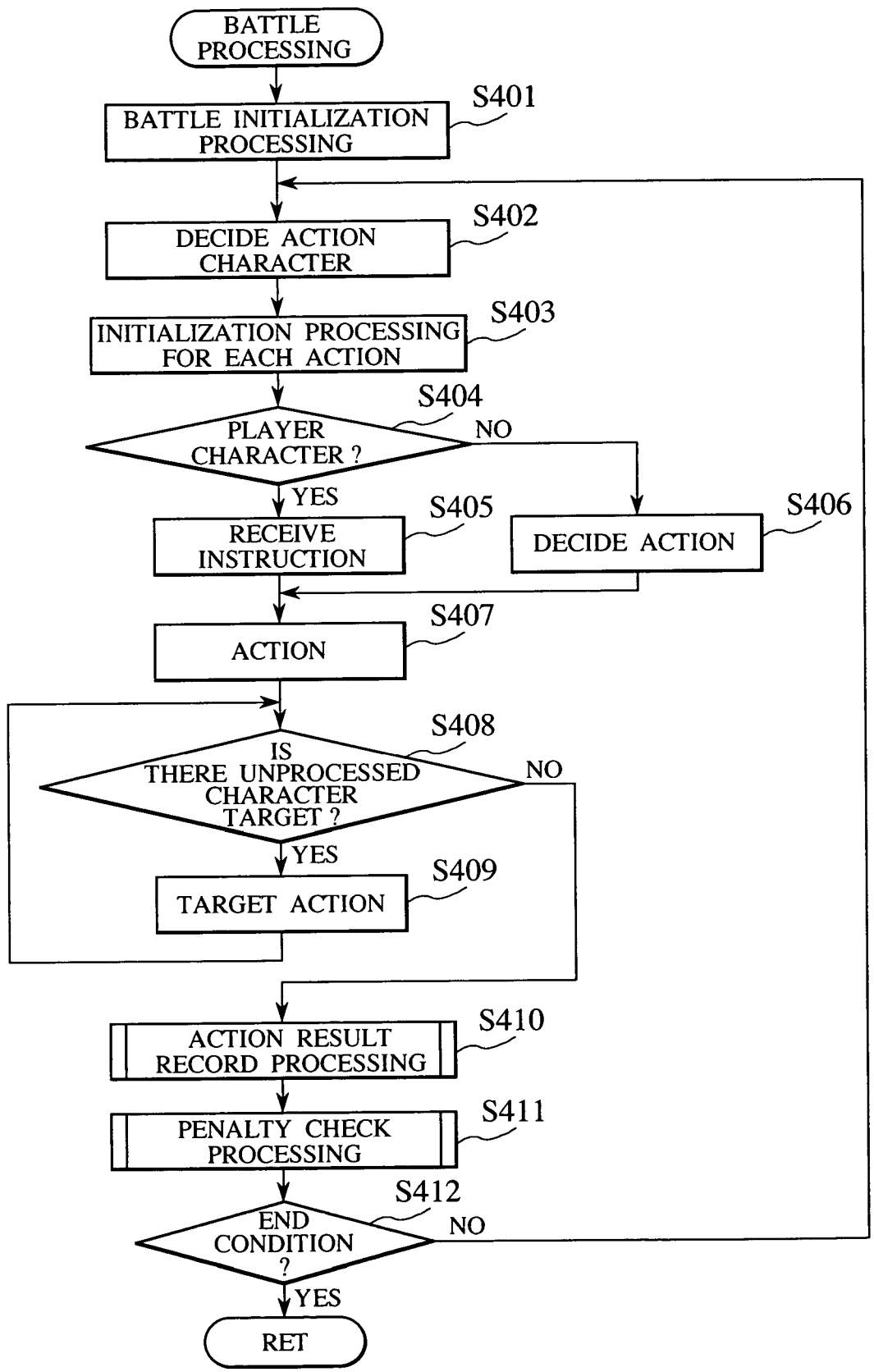
FIG. 11 is a flowchart illustrating an example of battle processing of FIG. 9.

FIG. 11 is a flowchart illustrating the battle processing in step S205. In the battle processing, the CPU 11 performs initialization processing for initializing general data 211 and CardFlag and LawID of the player character-specific data 212-1 to 212-n of the law check data (step S401).

The CPU 11 determines a character that will act according to Speed data among current data of the player character that participates in the battle and current data of the enemy character (step S402). When the acting character is determined, the CPU 11 performs each action initialization processing for initializing player character-specific data 212-1 to 212-n of law check data (note that CardFlag and LawID are excluded) (step S403).

The CPU 11 determines whether the acting character determined in step S402 is the player character or the enemy character (step S404). When the acting character is the player character, the CPU 11 receives an instruction of the action to the player character input from the controller 14 (step S405). Then, the processing flow proceeds to step S407.

When the acting character is an enemy character, the CPU 11 determines an action that the enemy character should perform according to data relating to the enemy character. In this case, it is not determined whether an action of the enemy character is against the rule (step S406). When the action of the enemy character is determined, the processing flow proceeds to step S407.

In step S407, the CPU 11 causes the acting player character or the enemy character determined in step S402 to carry out the action instructed in step S405 or the action determined in step S406. The CPU 11 determines whether there is an unprocessed character among the characters as the targets in connection with the action of the character in step S407 (step S408).

When there is an unprocessed character, the CPU 11 causes the character as the unprocessed target to perform an action subjected to an influence by the action of the character in step S407. This action includes not only such a passive action that is subjected to damage but also an active action that launches a counterattack against the character that launched an attack (step S409). After that, the processing flow goes back to step S408 again. When there is no unprocessed character in step S408, the CPU 11 performs action result record processing for recording the action of the character in step S407 and the action result (step S410).

Figure 12:
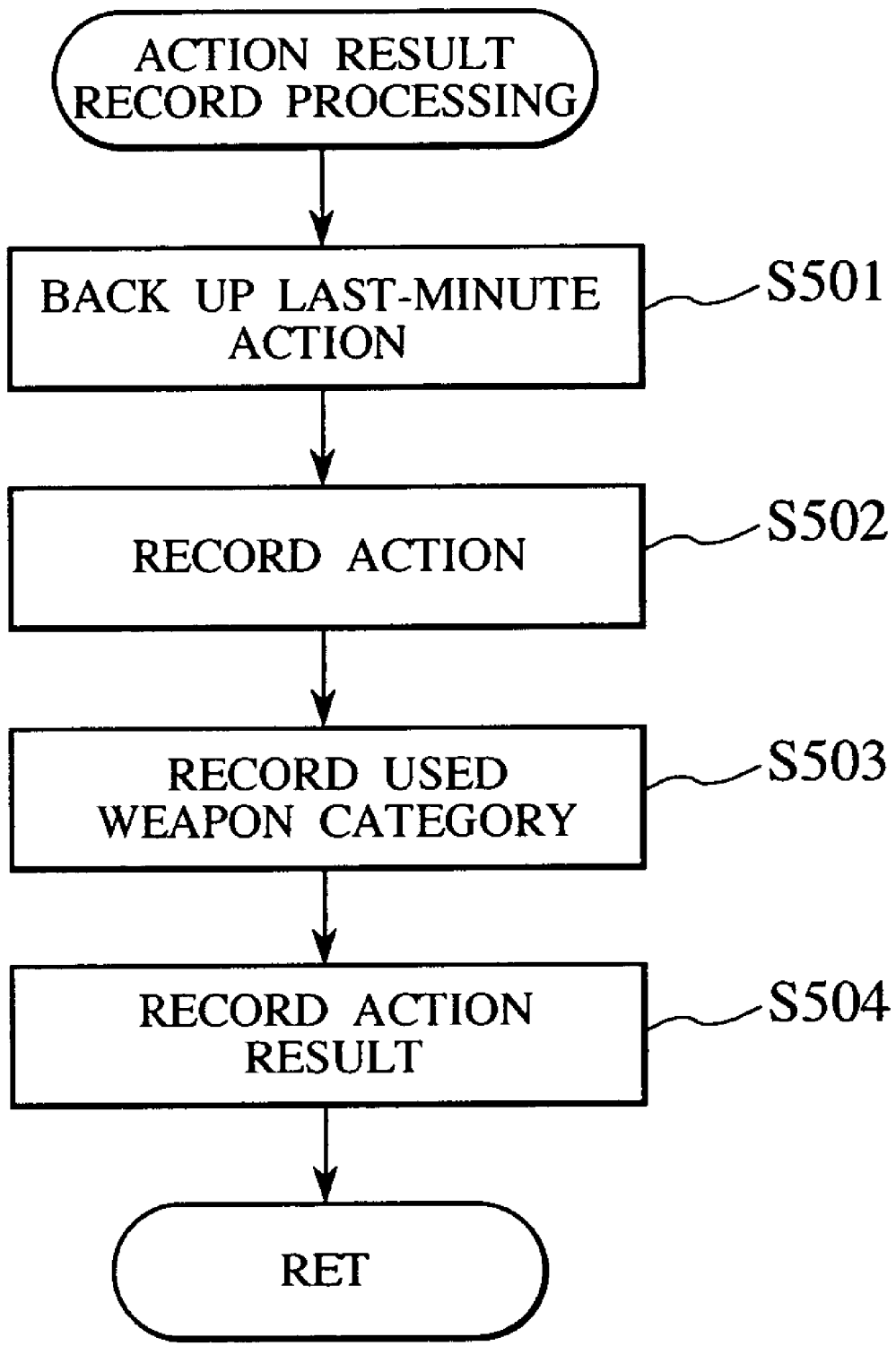
FIG. 12 is a flowchart illustrating an example of action result record processing of FIG. 11.

FIG. 12 is a flowchart specifically illustrating the action result record processing in step S410. In the action result record processing, the CPU 11 backs up the latest action of the character. More specifically, the CPU 11 copies data of MenuID included in the entire data 211 of law check data onto MenuID_OLD, and copies data of AbilityID onto AbilityID_OLD (step S501).

The CPU 11 records the action of the character in step S407. More specifically, the CPU 11 records an action menu on the MenuID, and an A ability ID on the AbilityID (in a case where the A ability is selected). In a case where an active action, such as "fight," is not instructed or decided, but rather an instruction or decision that prevents the character from acting, such as "wait," occurs, the CPU 11 clears data of the MenuID and AbilityID (step S502).

The CPU 11 records a category of the weapon that is used by the character in the action in step S407. More specifically, when the action that uses the weapon such as "fight" is recorded on the MenuID, the category of the weapon, which the character has, is recorded on Weapon[2]. When A ability is recorded on the AbilityID, the CPU 11 checks the essential weapon in the A ability and records the category on the Weapon[2] (step S503).

The CPU 11 further records the result of the actions in steps S407 and S409. More specifically, when even one enemy character is petrified or HP=0 is established as the result of the action, the CPU 11 turns on TermFlag of player character-specific data 212-1 to 212-n in connection with the character that has performed the relevant action. When the character that has performed the relevant action steals an item from the enemy character, the CPU 11 turns on ItermFlag of player character-specific data 212-1 to 212-n in connection with the character that has performed the relevant action. When a status change occurs in the character that has performed the relevant action or has been subjected to the action, the CPU 11 records this fact on Status of the player character-specific data 212-1 to 212-n about the character whose status has been changed. The CPU 11 records the number of characters as targets due to the relevant action on TargetNum of the player character-specific data 212-1 to 212-n about the character that has performed the relevant action. The CPU 11 records damage given to the other character by the relevant action or a recovery value on Damage[1] to [k] of the player character-specific data 212-1 to 212-n about the character that has performed the relevant action (step S504). Then, the action result record processing is ended.

When the action result record processing is ended and the processing flow goes back to the battle processing in FIG. 11, the CPU 11 performs penalty check processing for checking whether a penalty is imposed on the player when the violation of the rule set in step S107 occurs by the action of the character in stepS407 and the action result (step S411).

Figure 13:
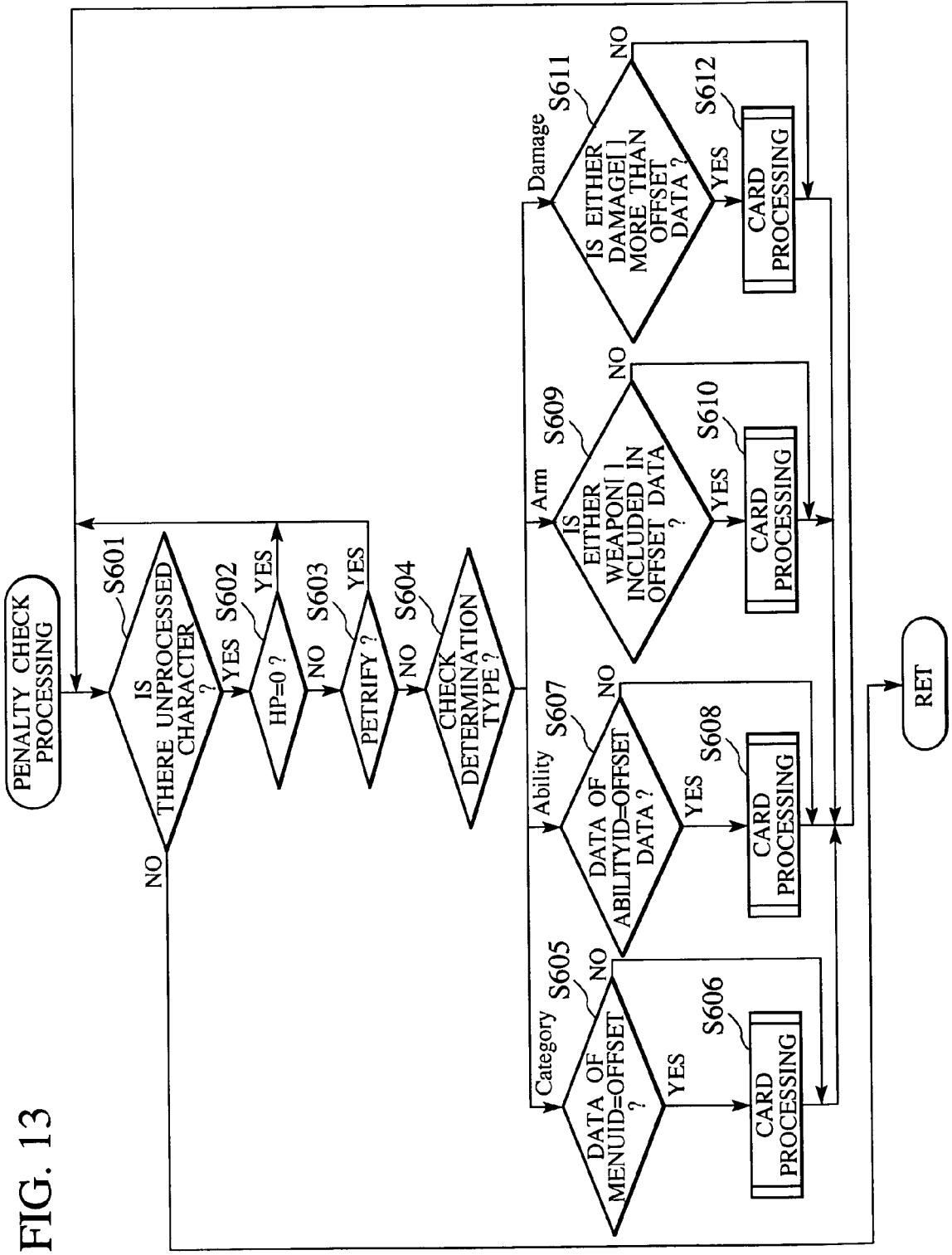
FIG. 13 is a flowchart illustrating an example of penalty check processing of FIG. 11.

FIG. 13 is a flowchart illustrating the penalty check processing in step S411. In the penalty check processing, the CPU 11 checks whether there are player characters that are not yet processing objects to be subjected to the penalty check among the player characters, which are selected by the player in step S201 and which have participated in the battle (step S601).

When there are characters that are not yet processing objects, the CPU 11 checks whether HP of the player character as the processing object is 0 with reference to the player character-specific data 212-1 to 212-n in connection with any one of the player characters that are not yet processing objects (step S602). When HP is not 0, the CPU 11 determines whether the relevant player character is petrified (step S603).

When HP of the player character as a processing object is 0 or the player character as a processing object is petrified, processing that is performed to the relevant character is ended and the processing flow goes back to step S601. When the player character as a processing object is not petrified, the CPU 11 checks the determination type of the law set as a rule in step S107 (step S604).

When the determination type of the law is Category, the CPU 11 determines whether data of MenuID of the entire data 211 is offset data of the law set as a rule in step S107 (step S605). When data of MenuID is not offset data, the processing flow goes back to step S601 directly. When data of MenuID is offset data, the CPU 11 performs card processing to be described later (step S606). After completing the card processing, the processing flow goes back to step S601.

When the determination type of the law is Ability, the CPU 11 determines whether data of AbilityID of the entire data 211 is offset data of the law set as a rule in step S107 (step S607). When data of AbilityID is not offset data, the processing flow goes back to step S601 directly. When data of AbilityID is offset data, the CPU 11 performs card processing to be described later (step S608). After completing the card processing, the processing flow goes back to step S601.

When the determination type of the law is Arm, the CPU 11 determines whether data of either Weapon [1] or [2] included in the player character-specific data 212-1 to 212-n as processing objects is offset data of the law set as a rule in step S107 (step S609). When neither Weapon [1] nor [2] is offset data, the processing flow goes back to step S601 directly. When data of either Weapon [1] or [2] is offset data, the CPU 11 performs card processing to be described later (step S610). After completing the card processing, the processing flow goes back to step S601.

When the determination type of the law is Damage, the CPU 11 determines whether a value, which is shown by data of any one of Damage [1] to [k] included in the player character-specific data 212-1 to 212-n as processing objects, is more than offset data of the law set as a rule in step S107 (step S611). When the value, which is shown by data of any one of Damage [1] to [k], is not more than offset data of the law, the processing flow goes back to step S601 directly. When the value, which is shown by data of any one of Damage [1] to [k], is more than offset data of the law, the CPU 11 performs card processing to be described later (step S612). After completing the card processing, the processing flow goes back to step S601.

In step S601, when it is determined that there is no player character that is subjected to processing, the penalty check processing ends.

Figure 14:
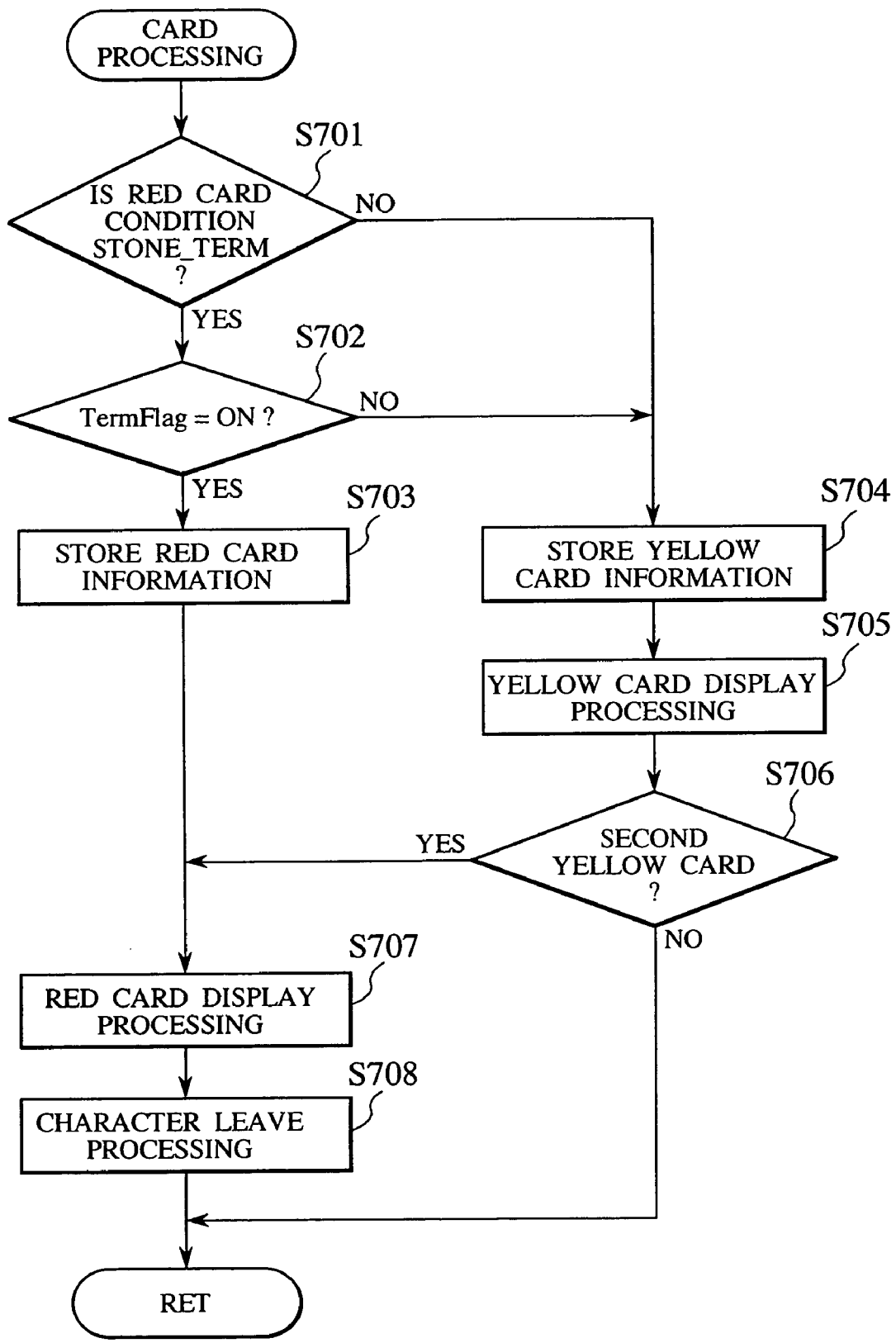
FIG. 14 is a flowchart illustrating an example of card processing of FIG. 13.

FIG. 14 is a flowchart illustrating card processing performed in step S606, S608, S610, or S612. In the card processing, the CPU 11 determines whether the red card condition of the law set as a rule in step S107 is STONE_TERM (step S701). When the red card condition is STONE_TERM, the CPU 11 determines whether TermFlag included in the player character-specific data 212-1 to 212-n as processing objects is turned on (step S702).

When TermFlag is turned on, the CPU 11 sets a flag, which indicates the red card, to either CardFlag [1] or [2], whichever is empty, included in the character-specific data 212-1 to 212-n of the relevant player character, and thereby records that the red card is presented to the relevant player character because of the rule violation. The CPU 11 adds a RedCard value included in current data about the relevant character by one, and thereby updates the cumulative number of red cards (step S703). Then, the processing flow proceeds to step S707.

When the red card condition is not STONE_TERM or TermFlag is not turned on, the CPU 11 sets a flag, which indicates the yellow card, to CardFlag [1] included in the character-specific data 212-1 to 212-n of the relevant player character, or sets a flag, which indicates the yellow card, to CardFlag [2] when the flag is already set to CardFlag[1], and thereby records that the yellow card is presented to the relevant player character because of the rule violation. The CPU 11 increases a Yellow Card value included in current data about the relevant character by one, and thereby updates the cumulative number of yellow cards (step S704).

The CPU 11 performs yellow card display processing in which the judge character presents the yellow card to the player character (step S705). The CPU 11 checks whether both CardFlags [1] and [2] are turned on, and thereby determines whether a second yellow card is presented (step S706). When only the first yellow card is presented, the card processing ends and the processing flow goes back to penalty check processing in FIG. 13. When the second yellow card is presented, with the result that the red card is presented, the processing flow proceeds to step S707.

The CPU 11 performs red card display processing in which the judge character presents the red card to the player character (step S707). The CPU 11 performs processing for causing the player character to which the red card is presented to leave the battle map 110 (step S708). Then, the card processing is ended and the processing flow goes back to penalty check processing in FIG. 13.

When the penalty check processing is ended and the processing flow goes back to the battle processing in FIG. 11, the CPU 11 determines whether a battle processing end condition is established (step S412). The battle processing end condition includes a stop condition for a predetermined reason in addition to a victory condition and a defeat condition. When the battle processing end condition is not established, the processing flow goes back to the processing in step S402. When the battle processing end condition is established, the battle processing ends.

When the battle processing is ended and the processing flow goes back to the event processing in FIG. 9, the CPU 11 performs penalty processing for imposing a penalty on the player according to the passage of battle processing and the result thereof (step S206).

Figure 15:
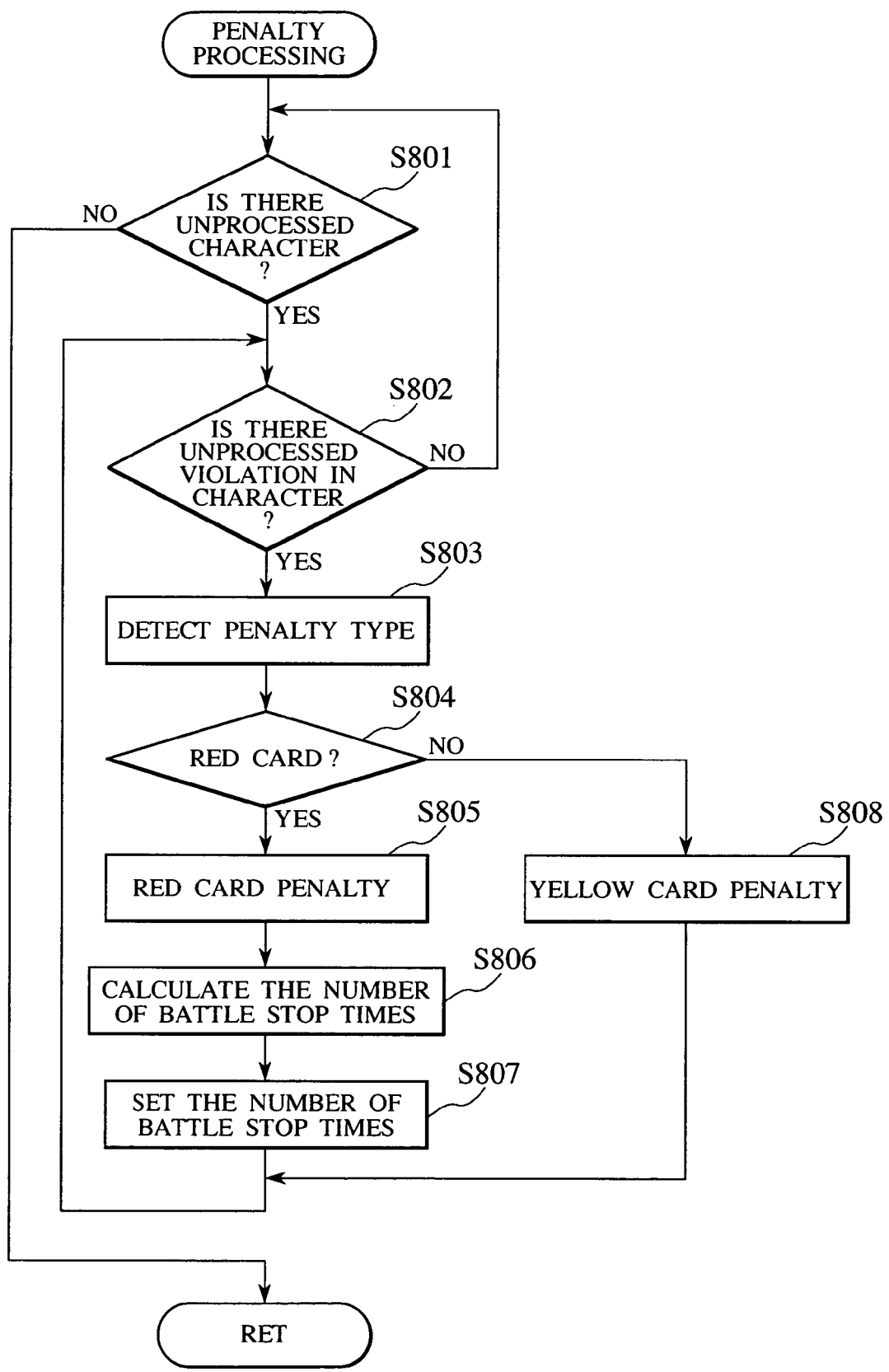
FIG. 15 is a flowchart illustrating an example of penalty processing of FIG. 9.

FIG. 15 is a flowchart illustrating the penalty processing in step S206. In the penalty processing, the CPU 11 determines whether there are player characters that are not yet processing objects to be subjected to the penalty check among the player characters that have participated in the battle (step S801).

When there are player characters that are not yet processing objects, the CPU 11 checks whether there is a rule violation where no processing is performed in connection with any one of the player characters that are not yet processing objects (step S802). When there is no rule violation where no processing is performed, the processing flow goes back to the step 801. The CPU 11 determines whether there is any further player character that is not yet a processing object. When there is a rule violation where no processing is performed, the CPU 11 detects the penalty type of the law corresponding to the rule set in step S107 (step S803). The CPU 11 determines whether there is a rule violation in which the red card is presented with reference to CardFlag[1], [2] in connection with the player characters as processing objects (step S804).

When there is a rule violation where the red card is presented, the CPU 11 imposes a penalty defined for the red card in connection with the penalty type detected in step S803.

When the penalty type is STAT_DOWN, the CPU 11 decreases two kinds of statuses (for example, HP and MP) in connection with the player character as a processing object (namely, the player character that is against the rule) (step S805).

The CPU 11 calculates the number of battle stop times where the relevant player character cannot participate in the battle because of the red card (step S806). The number of battle stop times can be obtained by an equation, for example, ((the cumulative number of yellow cards)+(the cumulative number of red cards)×2)×0.2+1. The CPU 11 sets the calculated number of battle stops to data of StopBattle about the relevant player character (step S807). Then, the penalty processing is ended.

Even though there is a violation of rule, when no rule violation deserving the red card occurs, the CPU 11 imposes a penalty defined for the yellow card about the penalty type detected in step S803. When the penalty type is STAT_DOWN, the CPU 11 decreases one kind of status in connection with the player character as a processing object (namely, the player character that is against the rule) (step S808). Then, the penalty processing is ended.

When the battle processing is ended and the processing flow goes back to the event processing in FIG. 9, the CPU 11 performs a predetermined end processing (step S207). This ends the event processing, and the processing flow returns to the aforementioned main routine in FIG. 8.

As explained above, in the game according to this embodiment, the stage of the game is updated by the end of the event and the player character moves on the world map 100 to update a virtual date, and thereby the rule set in the battle is changed. Since the rule changes sequentially according to the degree of the game progress according to this embodiment, a novel change occurs in the game progress to make it possible to continue to hold the player's interest in the game.

When there is a rule violation, a penalty is imposed on the player. The multiple kinds of penalties are prepared in advance and the penalty to be imposed changes according to the set rule. This causes a novel change in the game progress and makes it possible to maintain the player's interest in the game. When there is a rule violation, the yellow card or red card is presented to the player character by the degree (contents or the number of times). The weight of the penalty to be imposed on the player changes depending on which card is presented. When the red card is presented, the number of battle stop times is changed by the cumulative number of yellow cards or red cards. This also causes a novel change in the flow on the game progress.

When multiple player characters are selected as the player characters participating in the battle, there is a case that a penalty is imposed on only the player character that breaks the rule (case in which the penalty type is status down). When the penalty type is a fine or a consumption item confiscation, the penalty is imposed as a whole (namely, the penalty is imposed to the player). Various kinds of penalties are imposed and various influences occur in the game progress.

The rule violation is caused not only by the instruction to the player character provided by the player but also the result of the action instructed by the player. Since the latter includes an uncertain element in which it is uncertain that the rule violation occurs unless the player character is caused to perform an action, the change caused in the game progress varies.

The present invention is not limited to the aforementioned embodiment and various modifications and applications may be possible. The following will explain some modifications of the aforementioned embodiment that are applicable to the present invention.

In the aforementioned embodiment, there was a case in which the action of the player character instructed from the controller 14 by the player was against the rule and a case in which the result of the action was against the rule. Even in a case that the action instructed by the player was against the rule, the player character was caused to perform the action instructed by the player. In contrast to this, the presentation of the yellow or red card and the record of the rule violation may be performed at the time when the action instructed by the player is against the rule. The player character may not be caused to perform the action instructed by the player.

In the aforementioned embodiment, the stage of the game was updated when the events 1 to 5 were ended, and the visual date in the game was updated when the player character moved on the world map 100. The law set as the rule changed as the stage of the game and the date advanced based on the staged law table in FIG. 6B. The number of rules set at the same time was only one. However, the present invention is not limited to this.

The change in the degree of the game progress, which exerts an influence on the change in the rule, may be based on a change in, for example, an experience value of the player character instead of the change in the stage due to the end of the event and the date due to the movement of the player character on the world map 100. Moreover, the multiple laws are simultaneously set as a rule, and thereby the multiple rules may be simultaneously applied in the battle. In order that the multiple laws are simultaneously set as a rule, the number of laws set as a rule is increased as the degree of the game progress advances, and the number of rules to be simultaneously applied to the battle may be increased.

The multiple laws are classified into groups and the group of laws set as rules may be decided according to the degree of the game progress. In this case, when the group including the multiple laws is set as a rule, each law belonging to the relevant group is applied as a rule of the battle. In other words, there are multiple rules to be simultaneously applied to the battle.

In the aforementioned embodiment, when there was the rule violation, three consequences, namely, the fine, the status down and the consumption item confiscation were defined as a penalty imposed on the player. However, the penalties to be imposed were not limited to these. For example, the limitation of the kinds of weapons that can be used when the player character performs physical attack by the instruction from the player (for example, prohibition against taking up a bow and arrow and the like) and the limitation of the kinds of magic that can be used (for example, prohibition against working recovery magic and the like) can be applied as penalties. Such a penalty that a predetermined status abnormality is set in the player character may be applied. Instead of the status down of the player character, the status up of the enemy character may be applied as a penalty.

In the aforementioned embodiment, the weight of the penalty imposed on the player when the rule violation occurred was changed by depending on whether only the yellow card was presented because of the rule violation or the red card was also presented. However, the weight of the penalty imposed on the player can be changed by another method. For example, in a case where the status down is set as a penalty, the degree of status down may be changed. Not only the law applied as the rule but also the weight of penalty can be changed according to the degree of the game progress.

The penalty weight may be changed according to the cumulative number of yellow cards and the cumulative number of red cards recorded on the player character-specific data 202-1 to 202-n of current data. For example, a violation historical index is obtained similar to the number of battle stop times obtained in step S806, and the degree of penalty imposed on the player may be increased more with an increase in the violation historical index. This further causes a novel change in the game progress to make it possible to continue holding the player's interest in the game. The degree of penalty imposed on the player may be changed by the total of the cumulative number of yellow cards and the cumulative number of red cards regarding all player characters instead of the cumulative number of player character-specific yellow cards and the cumulative number of player character-specific red cards.

In the aforementioned embodiment, the player character performed the action that was against the rule by the player's instruction, but the enemy character was controlled not to perform the action that was against the rule. In contrast to this, the enemy character may perform the action that is against the rule. When the enemy character performs the action that is against the rule, the yellow card or red card may be presented to the enemy character to impose the same penalty as presented to the player character. The action that is against the rule may be made different between the player character and the enemy character.

In the aforementioned embodiment, the portable game device including the game device main body 1 and the cartridge 2 was used as a game device serving as a platform where the game of the present invention was executed. However, the game of the present invention may be executed using a stationary game device and a general-purpose computer such as a personal computer as a platform. The game of the present invention may be executed using other electronic equipment as a platform, which can function as a computer apparatus such as a cellular phone.

In the aforementioned embodiment, the program data for executing the game of the present invention was stored in the ROM 21 of the cartridge 2 and distributed. However, the program data may be stored in a storage medium such as a CD-ROM, a DVD-ROM and the like, and distributed. The program data for executing the game of the present invention may be stored in a fixed disk device, which a server apparatus existing in the Internet has. The server apparatus converts the program data stored in the fixed disc apparatus to a signal and superimposes the signal on a carrier wave, and distributes it to the game main body 1 via the Internet. The program distributed from the server apparatus can be stored in a flash memory and the like provided in the game main body 1 or the cartridge 2.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A video game apparatus, comprising:
    a movement instruction input section that inputs an instruction to move a player character between predetermined locations to which the player character can move on a map;
    a movement section that moves the player character between the predetermined locations in accordance with the instruction to move the player character between the predetermined locations;
    a time lapse section that updates a time unit of a virtual concept in the video game when the player character is moved between the predetermined locations;
    a rule storage that stores a rule to be set in accordance with the updated time unit;
    a rule judge that determines, with reference to the stored rule, a rule applicable when the video game advances, and that updates the rule based on the updated time unit;
    an instruction input device that inputs an instruction to advance the video game;
    a rule violation determiner that determines whether the determined rule is violated based on the instruction to advance the video game, wherein the rule violation determiner determines the degree of the violation of the rule when the rule violation determiner determines that the determined rule is violated;
    an item storage that stores items provided to the player as the video game progresses, wherein the item storage stores the items given to the player by classifying the items into groups based on a value;
    a penalty processor that imposes a predetermined penalty when the determined rule is violated; wherein the penalty processor deletes a predetermined item stored in the item storage to impose the penalty, the deleted item selected from a group in accordance with the degree of the violation of the determined rule; and
    a violation history storage that stores a history of determined violations, wherein the penalty processor imposes the predetermined penalty based on the stored history of violations.

2. The video game apparatus according to claim 1, further comprising:
    an instruction executer that executes processing in accordance with the instruction to advance the video game,
    wherein the rule violation determiner determines whether a result of the processing executed in accordance with the instruction to advance the video game is against the determined rule.

3. The video game apparatus according to claim 1,
    wherein the rule applicable when the video game advances is divided into multiple groups, and
    wherein the rule judge determines a rule that belongs to a group in accordance with the updated time unit as the rule applicable when the video game advances.

4. The video game apparatus according to claim 1,
    wherein a number of rules applicable when the video game advances is at least two, and
    wherein the rule judge increases the number of rules applicable when the video game advances.

5. The video game apparatus according to claim 1,
    wherein the instruction input device inputs an instruction to operate a player character,
    wherein the video game apparatus further comprises a characteristic value storage that stores a characteristic value of the player character that varies as the video game progresses, and wherein the penalty processor varies the stored characteristic value of the player character.

6. The video game apparatus according to claim 5,
wherein multiple player characters can be controlled from the instruction input device,
wherein the rule violation determiner judges a player character that violates the determined rule based on the instruction to operate the player character, and
wherein the penalty processor imposes the predetermined penalty on the player character that violates the rule.

7. The video game apparatus according to claim 1,
wherein the player character can execute multiple types of operations,
wherein the instruction input device inputs a type of operation to be executed by the player character, and
wherein the penalty processor limits the types of operations that can be executed by the player character to impose the penalty.

8. The video game apparatus according to claim 7,
wherein multiple player characters can be controlled from the instruction input device,
wherein the rule violation determiner judges a player character that violates the determined rule based on the instruction to advance the video game, and
wherein the penalty processor imposes the predetermined penalty on the player character that violates the rule.

9. The video game apparatus according to claim 1, further comprising:
an instruction executer that executes processing in accordance with the instruction to advance the video game,
wherein the rule violation determiner determines whether a result of the processing executed in accordance with the instruction to advance the video game is against the determined rule.

10. The video game apparatus according to claim 1,
wherein the rule is determined and updated by the rule judge, based on the time unit, in an incongruent manner.

11. A video game apparatus having a memory that stores a video game program and a processor that executes the video game program, the video game program causing the processor to:
receive input instruction to move a player character between predetermined locations to which the player character can move on a map;
the processor executing the video game program by:
moving the player character between predetermined locations on a map to which the player character can move in accordance with the instruction to move the player character between the predetermined locations;
updating a time unit of a virtual concept in the video game when the player character is moved between the predetermined locations;
storing a rule to be set in accordance with the updated time unit;
determining, with reference to the stored rule, a rule applicable when the video game advances;
updating the rule based on the updated time unit;
receiving an input instruction to advance the video game;
determining whether the determined rule is violated based on the instruction to advance the video game, wherein the degree of the violation of the rule is determined when the rule is violated;
storing a history of determined violations, wherein the predetermined penalty is imposed in accordance with the stored history of violations.

12. A method for advancing a video game executed by a computer, comprising:
the computer to receive input instruction to move a player character between predetermined locations to which the player character can move on a map;
the computer executing the video game program by:
moving the player character between predetermined locations in accordance with the instruction to move the player character between the predetermined locations;
updating a time unit of a virtual concept in the video game when the player character is moved between the predetermined locations;
storing a rule to be set in accordance with the updated time unit;
determining, with reference to the stored rule, a rule applicable when the video game advances;
updating the rule based on the updated time unit;
receiving an input instruction to advance the video game;
determining whether the determined rule is violated based on the instruction to advance the video game, wherein the degree of the violation of the rule is determined when the rule is violated;
storing items provided to the player as the video game progresses in an item storage; the stored items classified into groups based on a value;
imposing a predetermined penalty when the determined rule is violated, the penalty imposed by deleting a predetermined item stored in the item storage, the deleted item selected from a group in accordance with the degree of the violation of the determined rule; and
storing a history of determined violations, wherein the predetermined penalty is imposed in accordance with the stored history of violations.

13. A computer-readable storage medium on which a video game program is recorded, the video game program causing a computer to:
receive input instruction to move a player character between predetermined locations to which the player character can move on a map;
the computer to executing the video game program stored on the computer-readable storage medium by:
moving the player character between predetermined locations in accordance with the instruction to move the player character between the predetermined locations;
updating a time unit of a virtual concept in the video game when the player character is moved between the predetermined locations;
storing a rule to be set in accordance with the updated time unit;
determining, with reference to the stored rule, a rule applicable when the video game advances;
updating the rule based on the updated time unit;
receiving an input instruction to advance the video game;
determining whether the determined rule is violated based on the instruction to advance the video game, wherein the degree of the violation of the rule is determined when the rule is violated;
storing items provided to the player as the video game progresses in an item storage; the stored items classified into groups based on a value;
imposed a predetermined penalty when the determined rule is violated, the penalty imposed by deleted a predetermined item stored in the item storage, the deleted item selected from a group in accordance with the degree of the violation of the determined rule; and
storing a history of determined violations, wherein the predetermined penalty is imposed in accordance with the stored history of violations.

* * * * *

UNITED STATES PATENT AND TRADEMARK OFFICE
CERTIFICATE OF CORRECTION

PATENT NO. : 7,591,721 B2  Page 1 of 1
APPLICATION NO. : 10/648369
DATED : September 22, 2009
INVENTOR(S) : Y. Matsuno et al.

It is certified that error appears in the above-identified patent and that said Letters Patent is hereby corrected as shown below:

In column 19, between lines 60 and 61 (claim 11, between lines 25 and 26) of the printed patent, insert
      -- storing items provided to the player as the video game progresses in an item storage; the stored items classified into groups based on a value;
      imposing a predetermined penalty when the determined rule is violated, the penalty imposed by deleting a predetermined item stored in the item storage, the deleted item selected from a group in accordance with the degree of the violation of the determined rule; and --.

At column 20, line 56 (claim 13, line 28) of the printed patent, "imposed" should be -- imposing --.

At column 20, line 57 (claim 13, line 29) of the printed patent, "deleted" should be -- deleting --.

Signed and Sealed this

Seventeenth Day of August, 2010

David J. Kappos
*Director of the United States Patent and Trademark Office*